United States Patent
De Vries

(10) Patent No.: US 10,322,875 B2
(45) Date of Patent: Jun. 18, 2019

(54) APPARATUS AND METHOD FOR MANAGING THE STORAGE OF ARTICLES

(71) Applicant: I-COLLECTOR HOLDING B.V., Almere (NL)

(72) Inventor: Hugo Victor De Vries, Almere (NL)

(73) Assignee: I-COLLECTOR HOLDING B.V., Almere (NL)

( * ) Notice: Subject to any disclaimer, the term of this patent is extended or adjusted under 35 U.S.C. 154(b) by 0 days.

(21) Appl. No.: 15/547,479

(22) PCT Filed: Feb. 1, 2016

(86) PCT No.: PCT/NL2016/000002
§ 371 (c)(1),
(2) Date: Jul. 28, 2017

(87) PCT Pub. No.: WO2016/122309
PCT Pub. Date: Aug. 4, 2016

(65) Prior Publication Data
US 2018/0029796 A1   Feb. 1, 2018

(30) Foreign Application Priority Data

Jan. 30, 2015 (NL) .................................... 1041164
Feb. 2, 2015 (NL) .................................... 1041165

(51) Int. Cl.
*B65G 1/04* (2006.01)
*B65G 1/06* (2006.01)

(52) U.S. Cl.
CPC ............. *B65G 1/0435* (2013.01); *B65G 1/06* (2013.01)

(58) Field of Classification Search
CPC .............................. B65G 1/0435; B65G 1/06
See application file for complete search history.

(56) References Cited

U.S. PATENT DOCUMENTS 3,240,365 A * 3/1966 King ................... B65G 1/06
414/273
3,719,288 A * 3/1973 Schmitt ............... B65G 1/0407
198/597

(Continued)

FOREIGN PATENT DOCUMENTS

CN    1139409 A    1/1997
CN    1216285 A    5/1999
(Continued)

*Primary Examiner* — Kaitlin S Joerger
(74) *Attorney, Agent, or Firm* — Young & Thompson

(57) ABSTRACT

Device for keeping articles in temporary storage, including a frame having series storage sections provided with supports for series of holders, at least one first and at least one second platform configured for receiving at least one holder, wherein the platforms can be moved by a first movement unit from a position in which both are aligned with one of the storage sections to a position in which both are aligned with another one of the storage sections, wherein the device has been provided with a second movement unit for, in a first direction, horizontally moving one or more holders from the platform at a first frame side to the holder supports of a selected storage section, while moving the series of holders supported thereon over the selected storage section and moving one or more holders from the storage section to the platform at a second frame side.

20 Claims, 20 Drawing Sheets

(56) References Cited

U.S. PATENT DOCUMENTS

| | | | |
|---|---|---|---|
| 3,927,773 A | 12/1975 | Bright | |
| 4,010,855 A * | 3/1977 | Smith | B65G 1/0435 414/275 |
| 5,328,316 A | 7/1994 | Hoffman | |
| 5,364,220 A | 11/1994 | Killinger | |
| 5,927,926 A | 7/1999 | Yagi et al. | |
| 6,061,607 A | 5/2000 | Bradley et al. | |
| 6,170,634 B1 | 1/2001 | Jaquet | |
| 6,602,037 B2 | 8/2003 | Winkler | |
| 6,923,612 B2 | 8/2005 | Hansl | |
| 8,596,952 B2 * | 12/2013 | Wolkerstorfer | B65G 1/0435 414/280 |
| 8,740,542 B2 * | 6/2014 | Wolkerstorfer | B65G 1/0435 414/280 |
| 9,254,958 B2 * | 2/2016 | De Vries | B65G 1/0435 |
| 9,340,355 B2 * | 5/2016 | De Vries | B65G 1/0435 |
| 9,738,448 B1 * | 8/2017 | Yamagishi | B65G 1/0421 |
| 9,975,697 B2 * | 5/2018 | De Vries | B65G 1/0435 |
| 9,994,394 B2 * | 6/2018 | Masuda | B65G 1/0421 |
| 2004/0197172 A1 | 10/2004 | Hansl et al. | |
| 2004/0234364 A1 | 11/2004 | Ehrenleitner et al. | |
| 2006/0245858 A1 | 11/2006 | Suess | |
| 2009/0028675 A1 | 1/2009 | Tsujimoto et al. | |
| 2010/0098517 A1 | 4/2010 | Hishiya | |
| 2012/0198282 A1 | 7/2012 | Jones et al. | |
| 2013/0129455 A1 * | 5/2013 | De Vries | B65G 1/0435 414/277 |
| 2016/0137415 A1 | 5/2016 | De Vries | |
| 2016/0200511 A1 * | 7/2016 | De Vries | B65G 1/0435 414/280 |
| 2018/0029796 A1 * | 2/2018 | De Vries | B65G 1/06 |
| 2018/0134488 A1 * | 5/2018 | Grosse | B65G 1/0435 |

FOREIGN PATENT DOCUMENTS

| | | |
|---|---|---|
| CN | 101503141 A | 8/2009 |
| CN | 101767704 A | 7/2010 |
| DE | 19941640 A1 | 5/2000 |
| DE | 10058625 A1 | 6/2002 |
| EP | 0827692 A1 | 3/1998 |
| FR | 2915977 A1 | 11/2008 |
| GB | 1389221 | 4/1975 |
| JP | 3125707 U | 12/1991 |
| JP | 442104 U | 4/1992 |
| WO | 9615963 | 5/1996 |
| WO | 2010090512 A1 | 8/2010 |
| WO | 2012018255 A1 | 2/2012 |
| WO | 2012134269 A1 | 10/2012 |

* cited by examiner

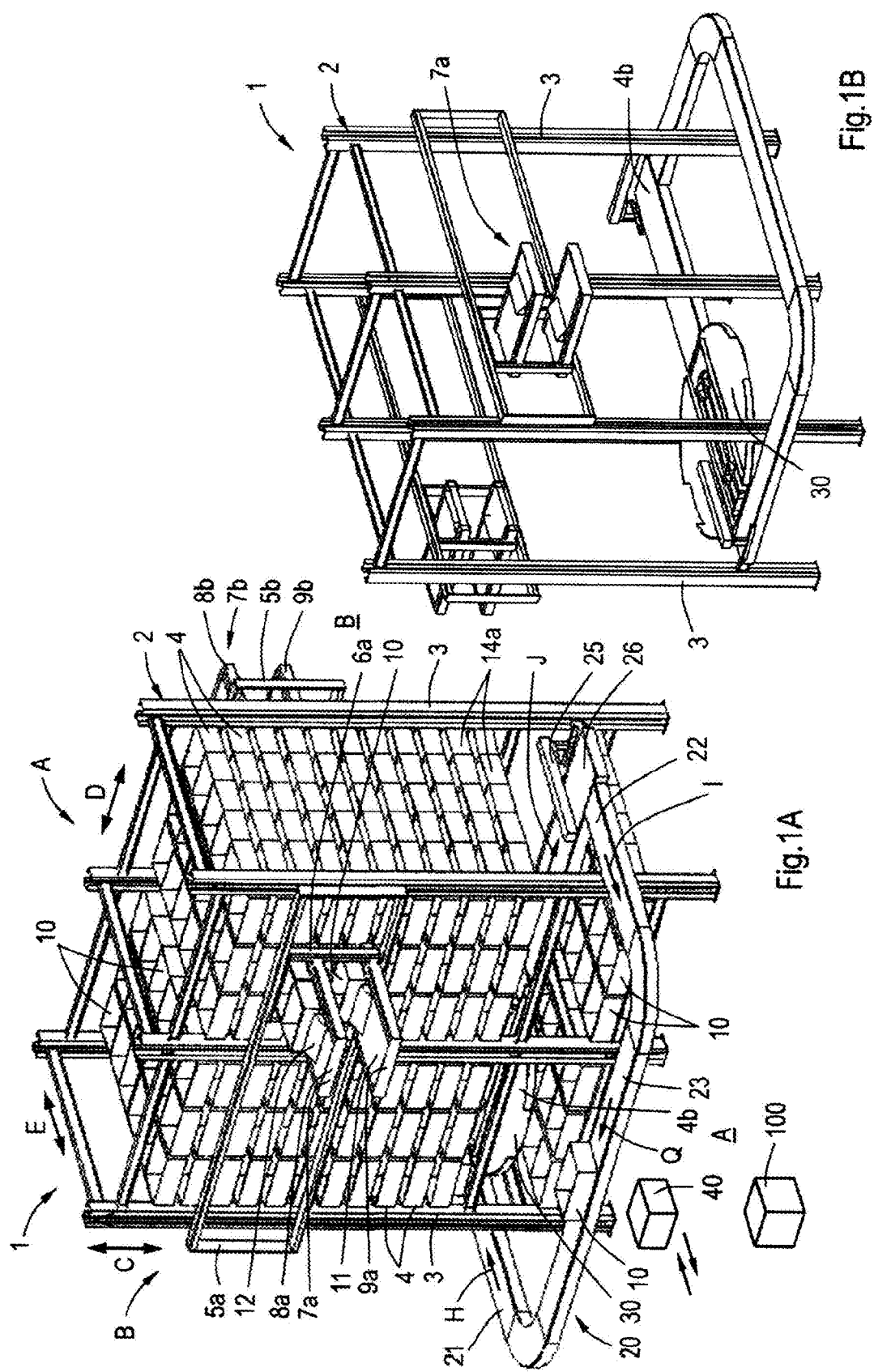

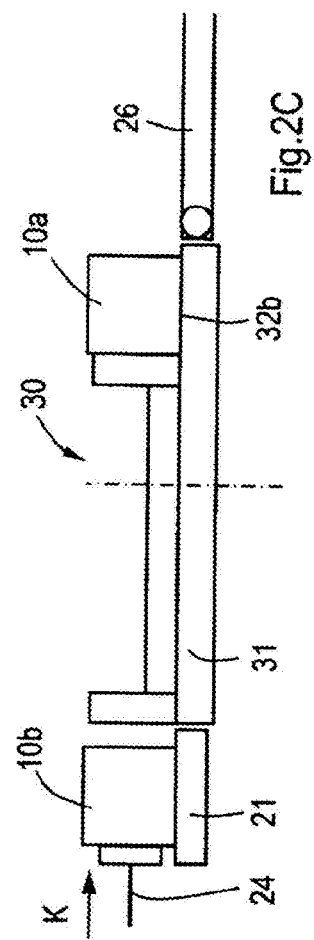
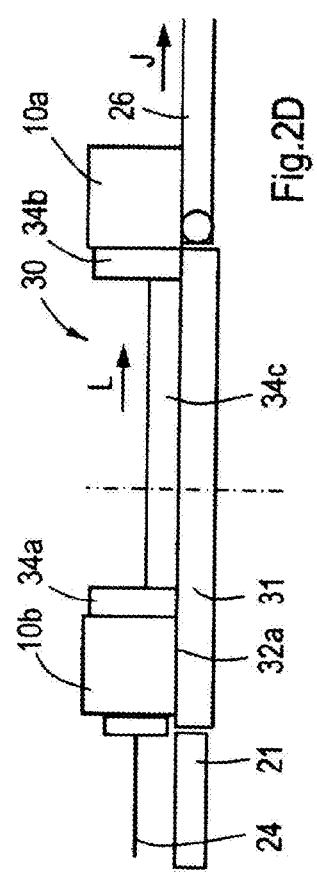
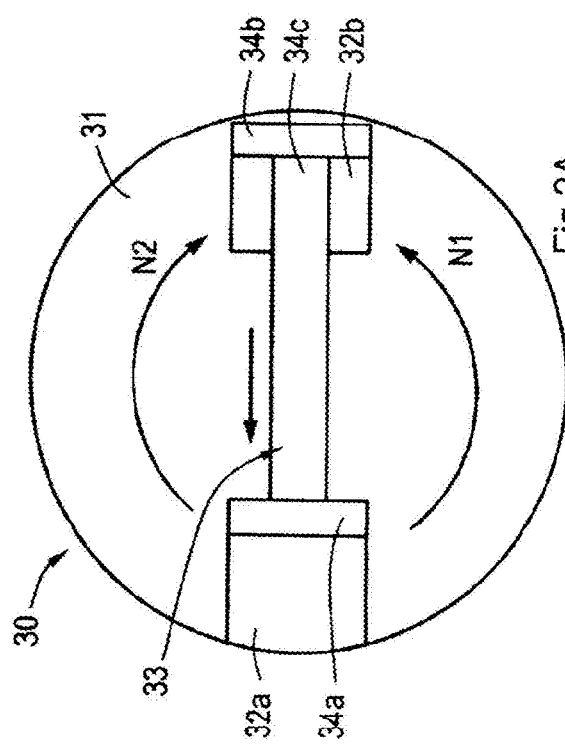
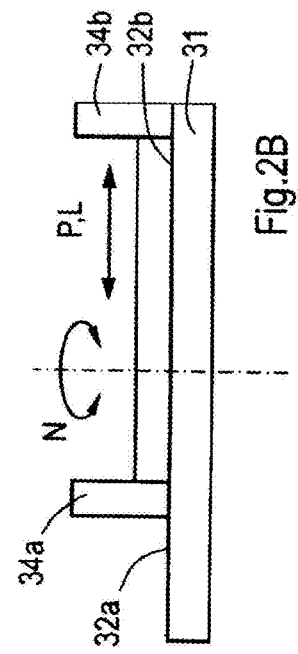

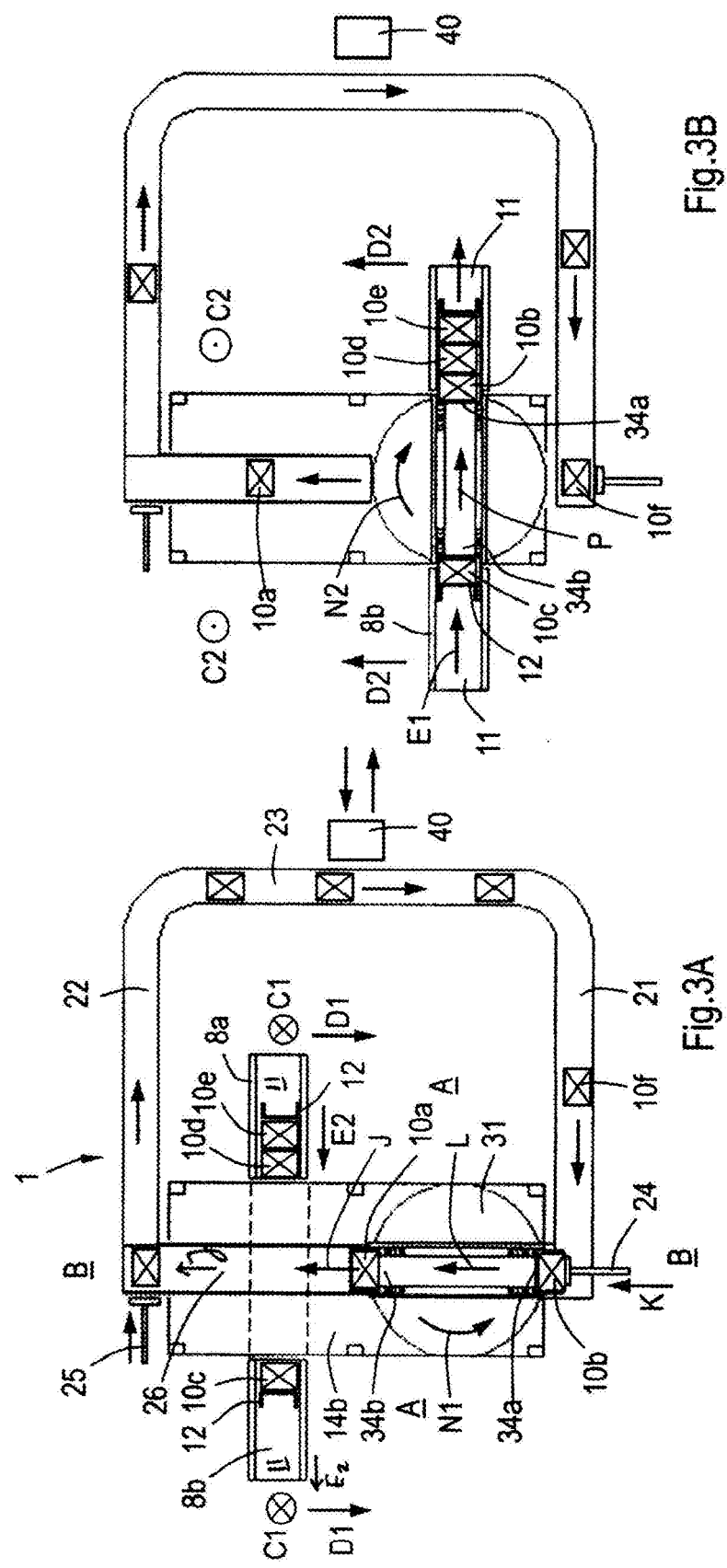

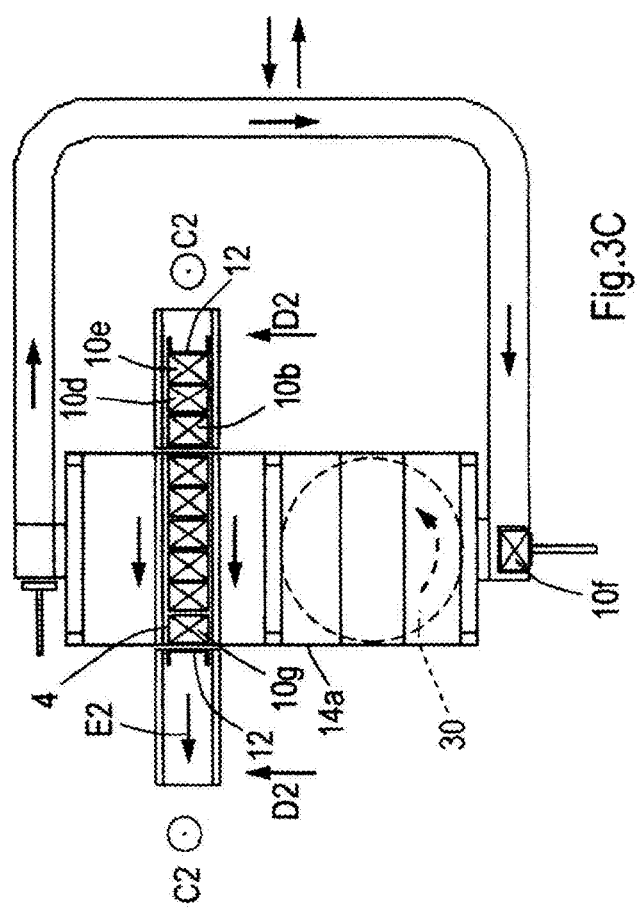

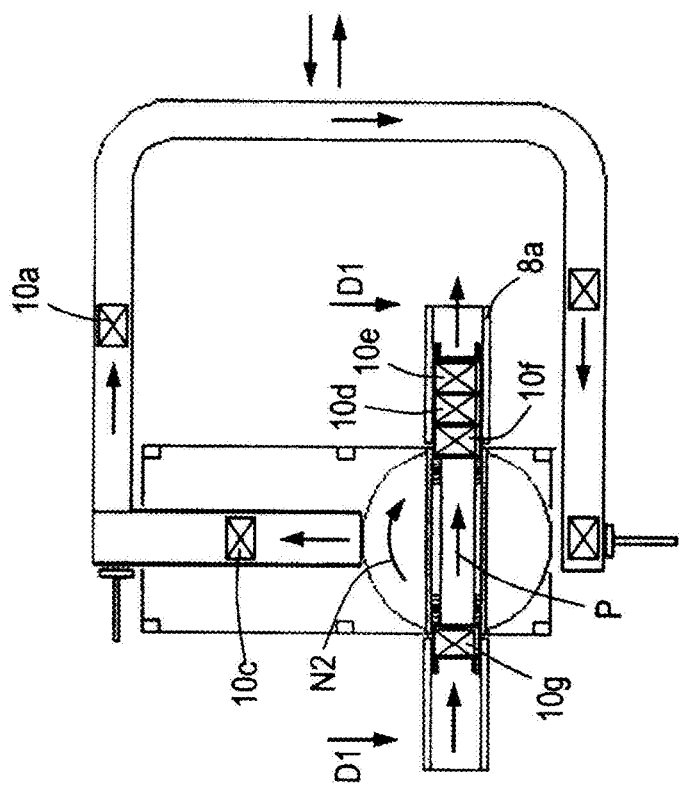
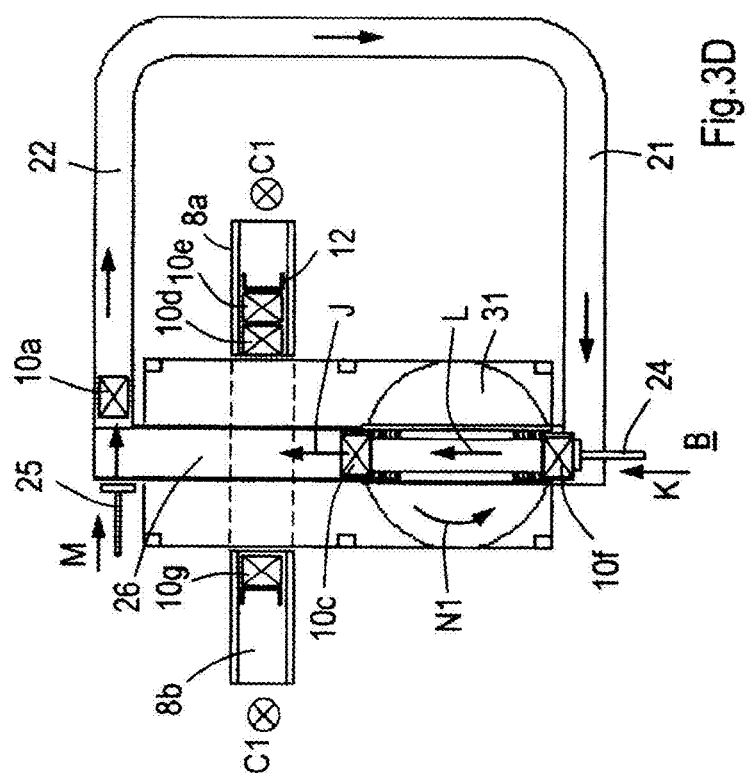

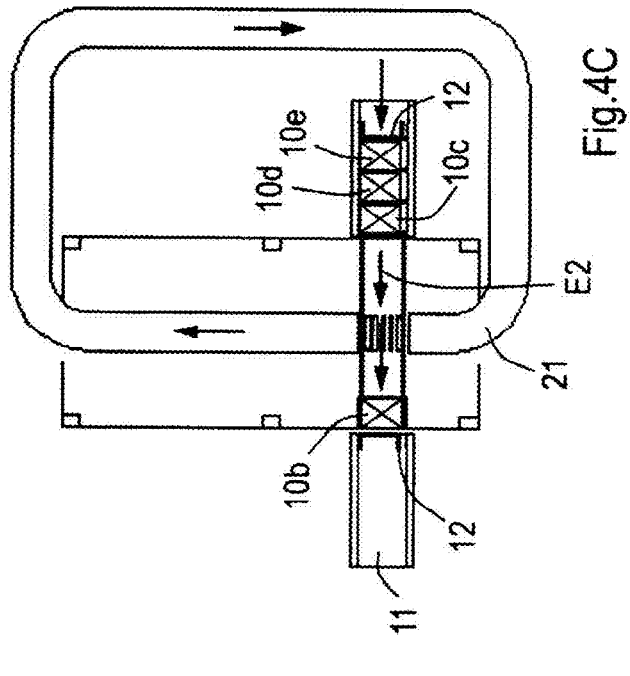
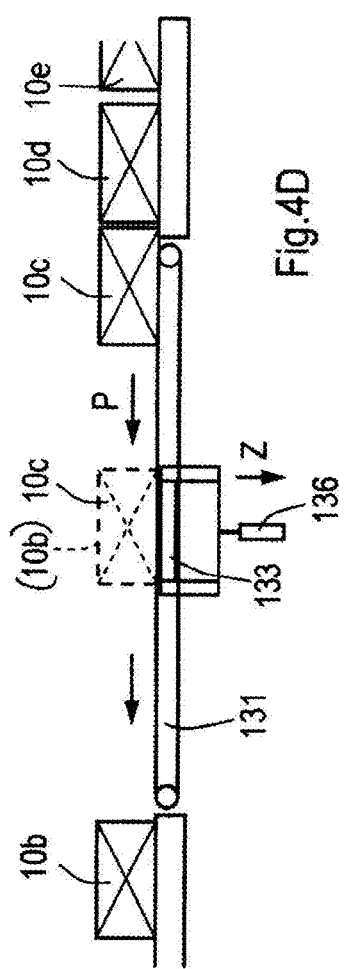
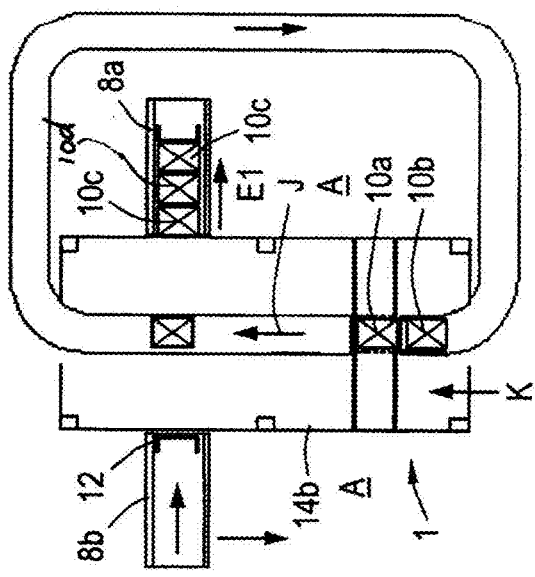
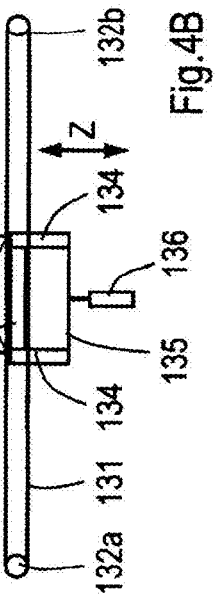

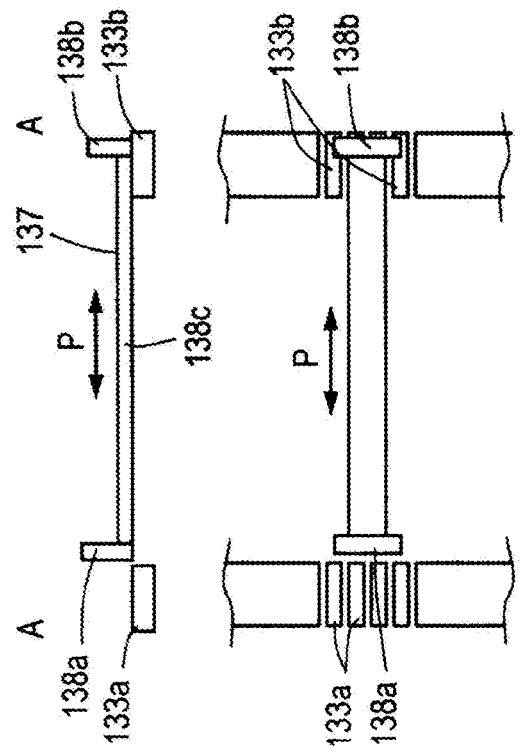
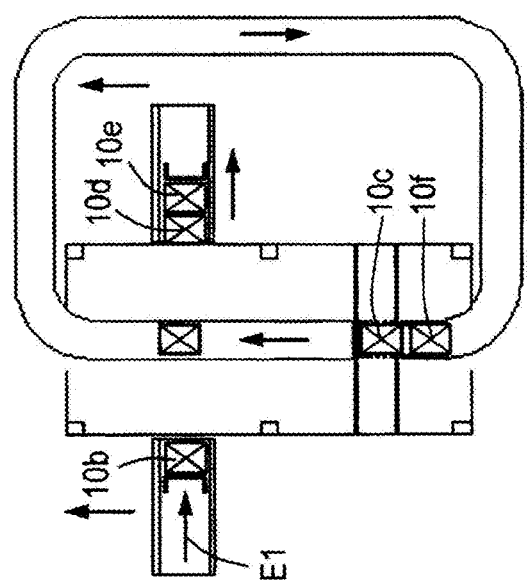
Fig.4F
Fig.4E

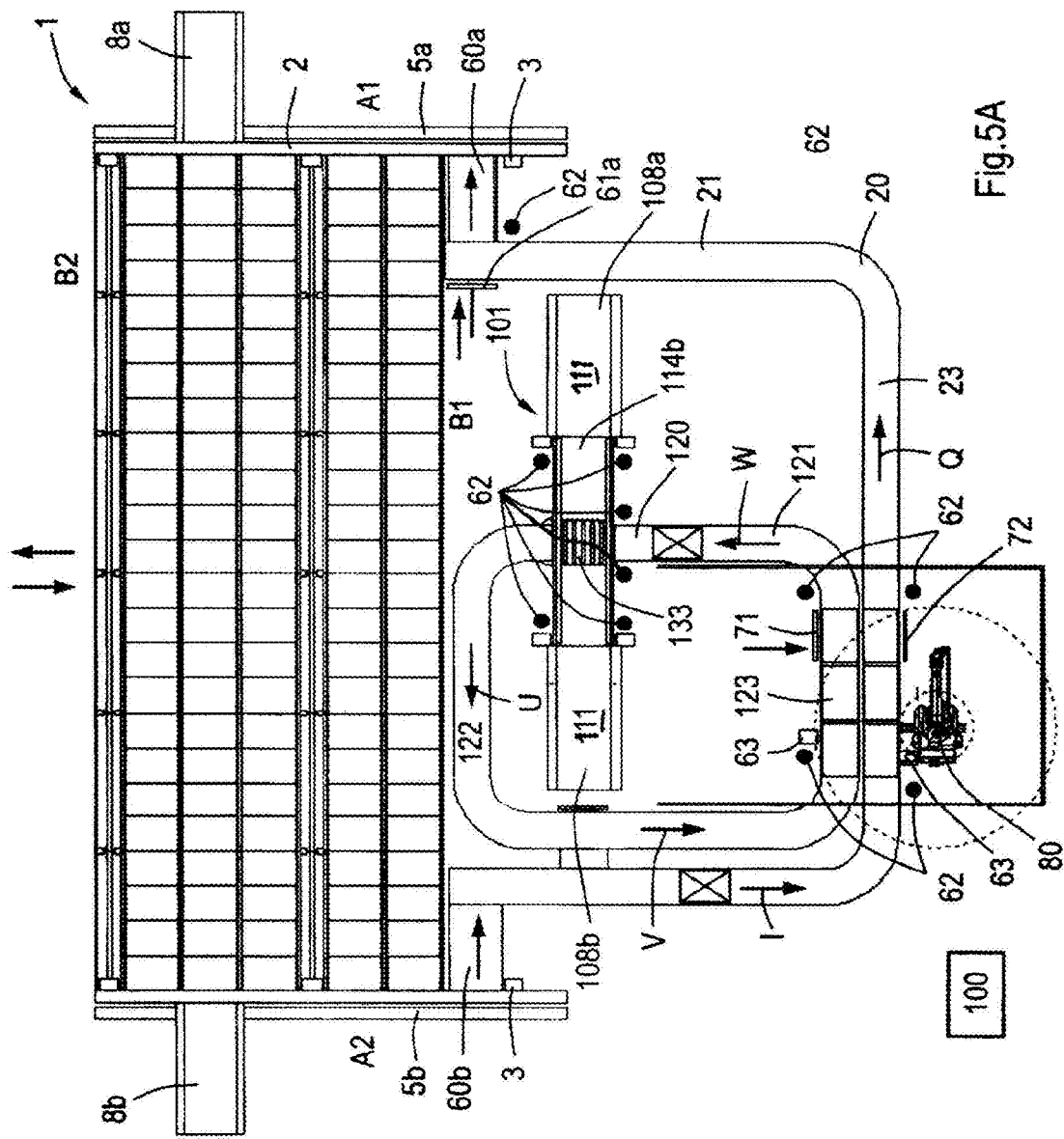

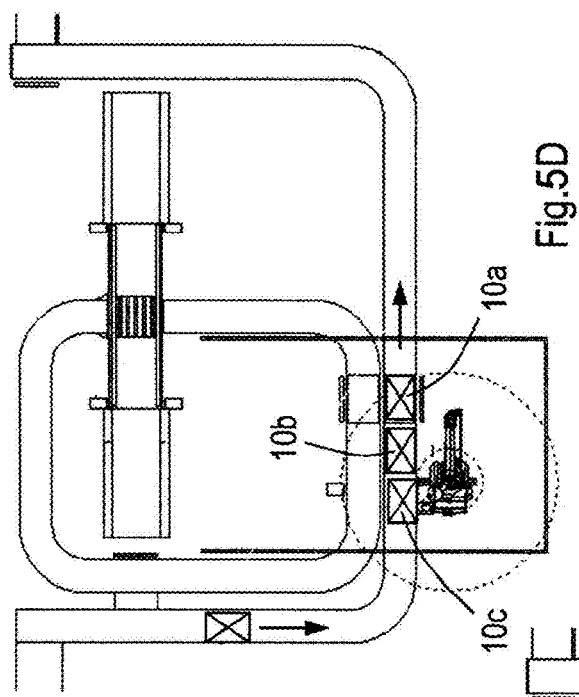
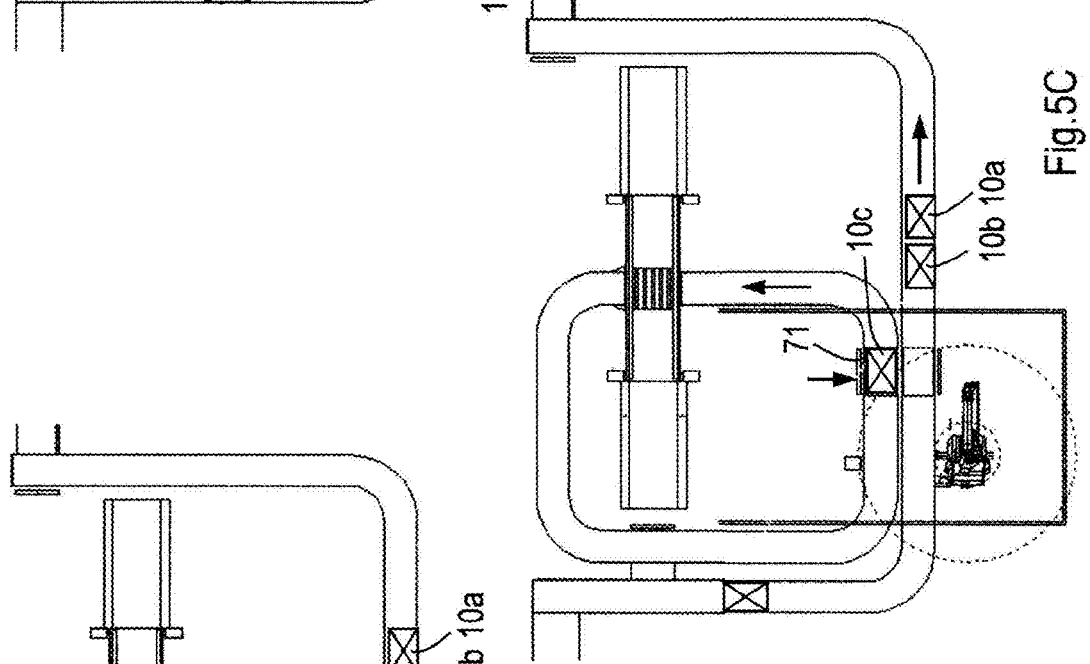
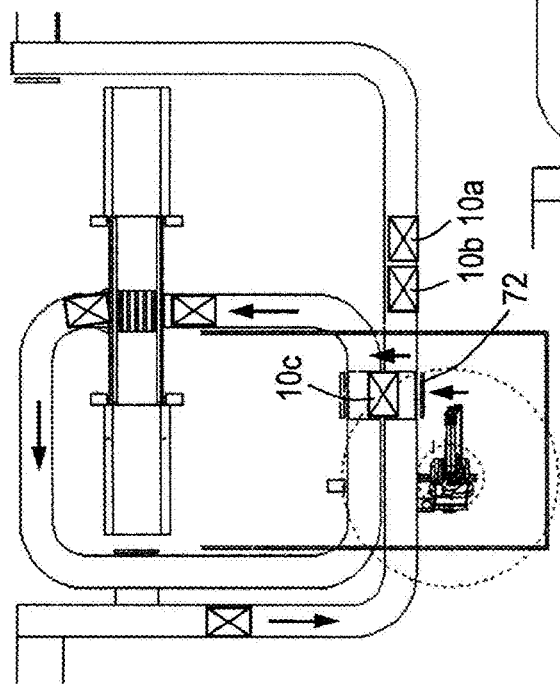

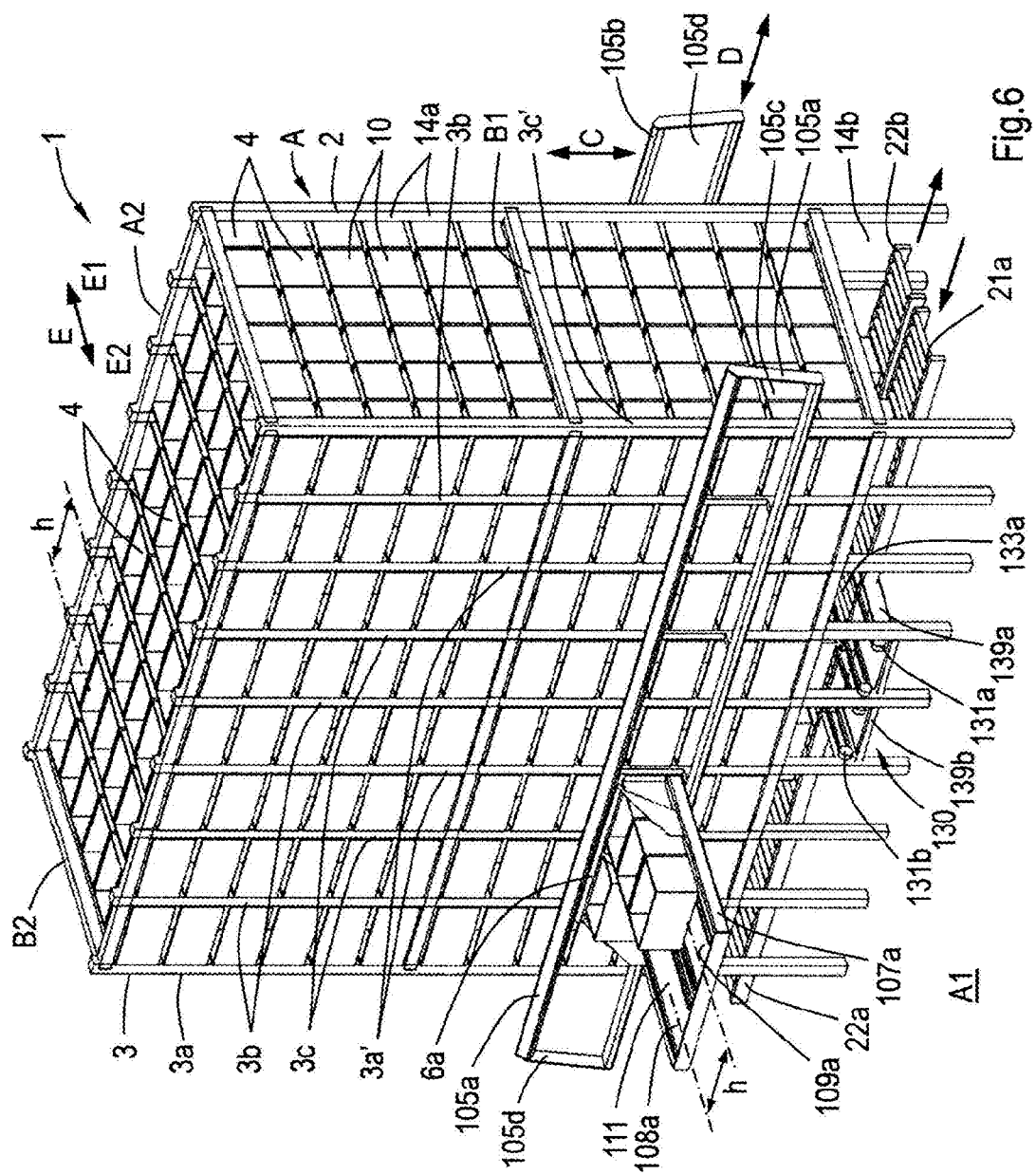

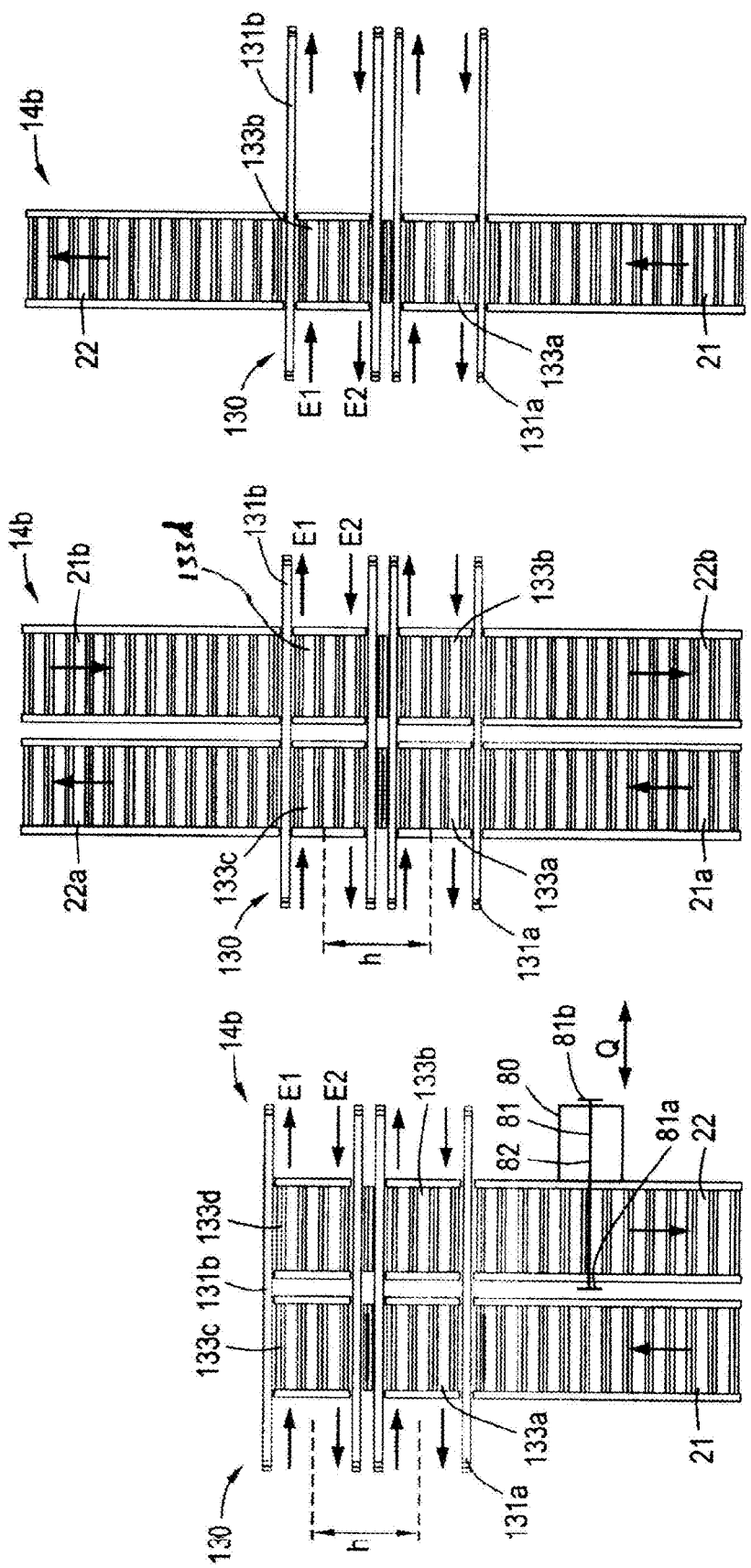

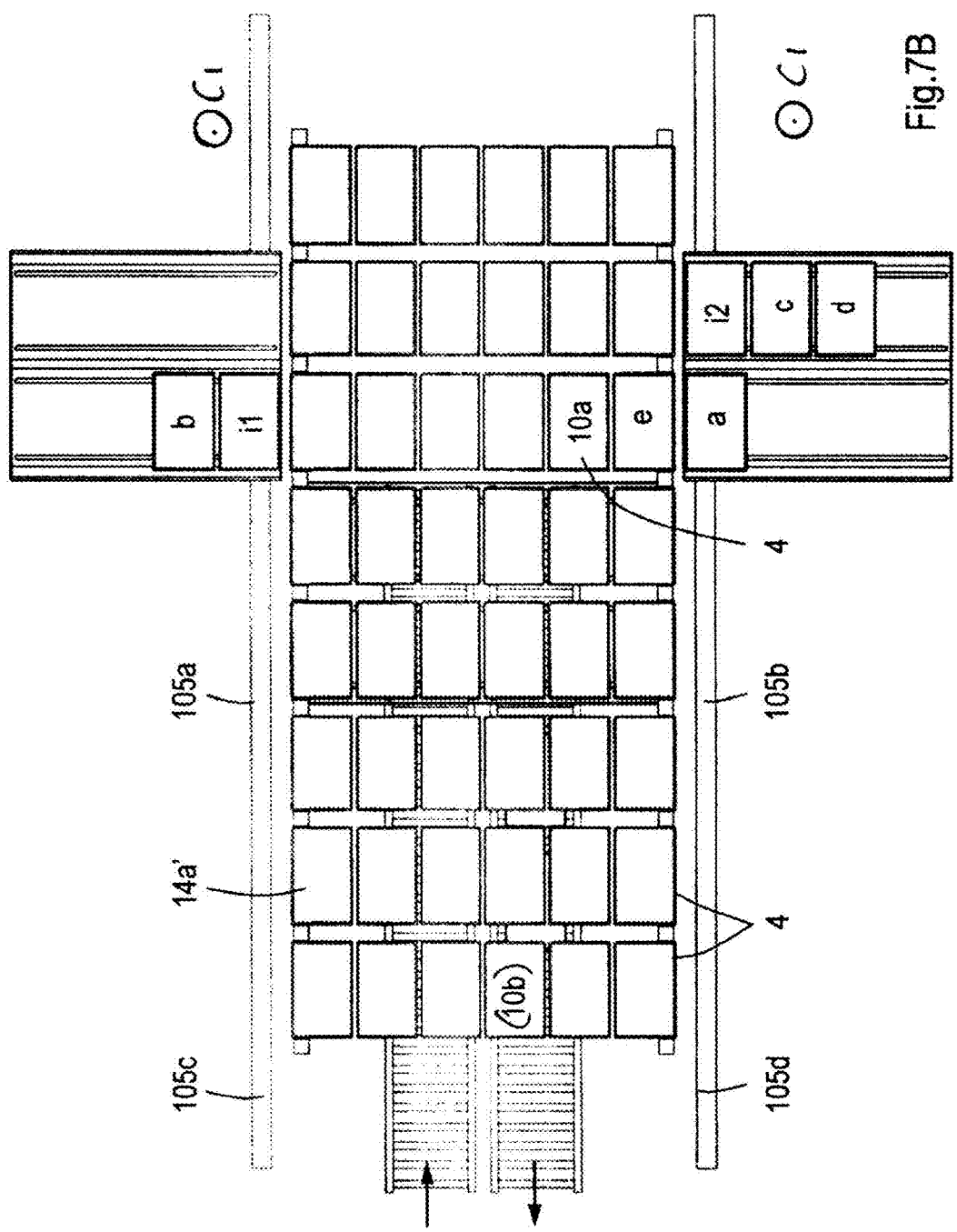

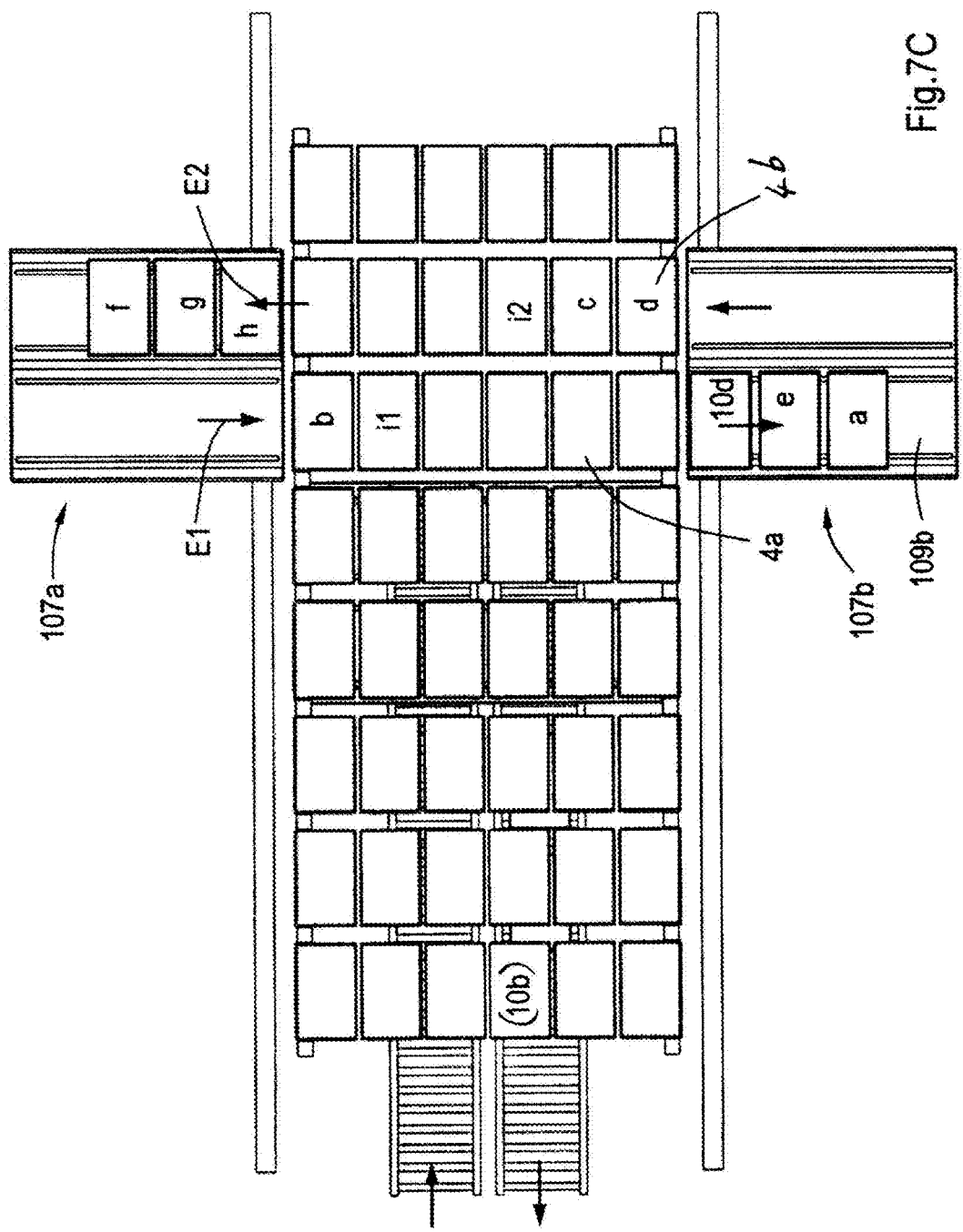

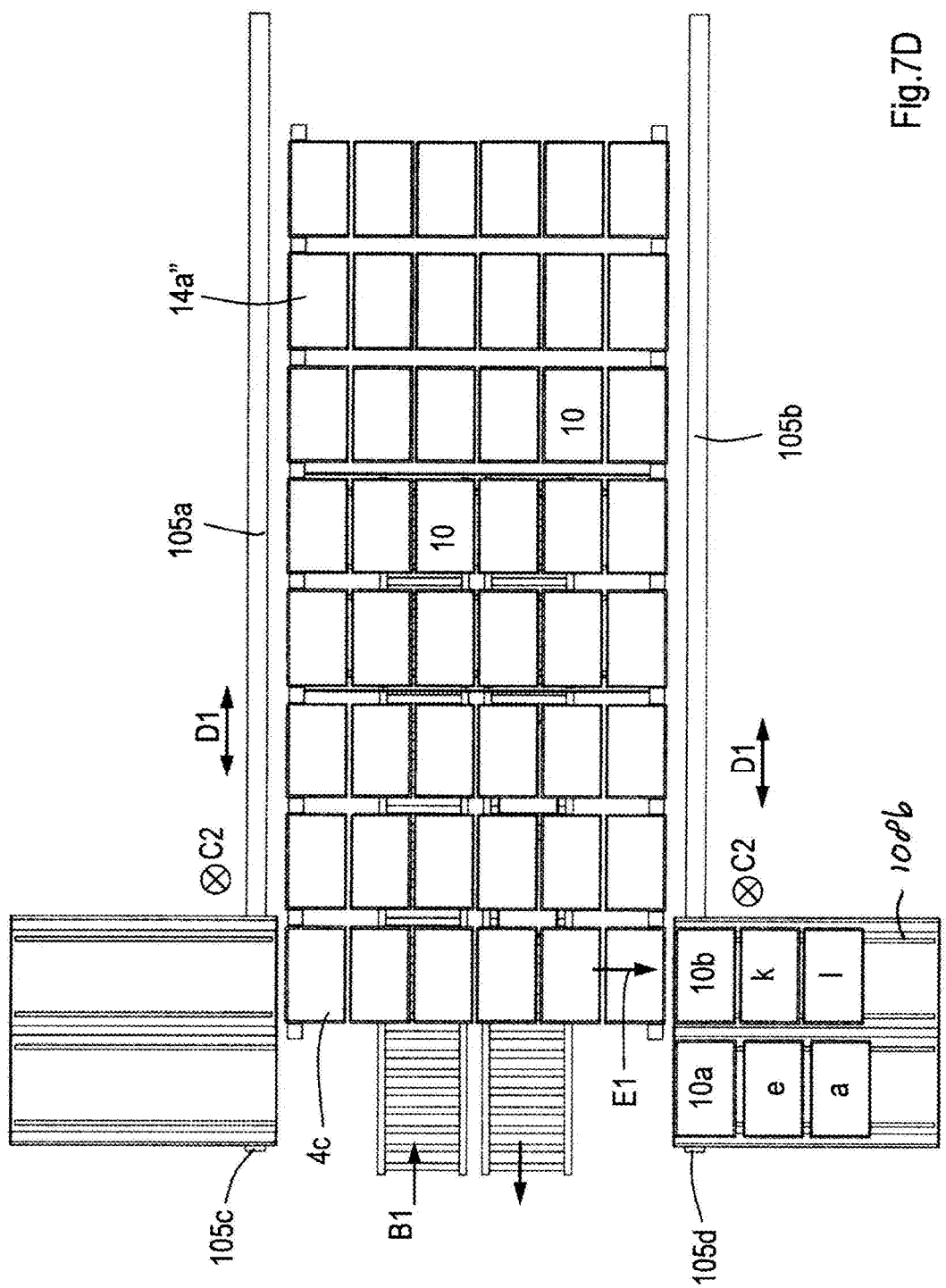

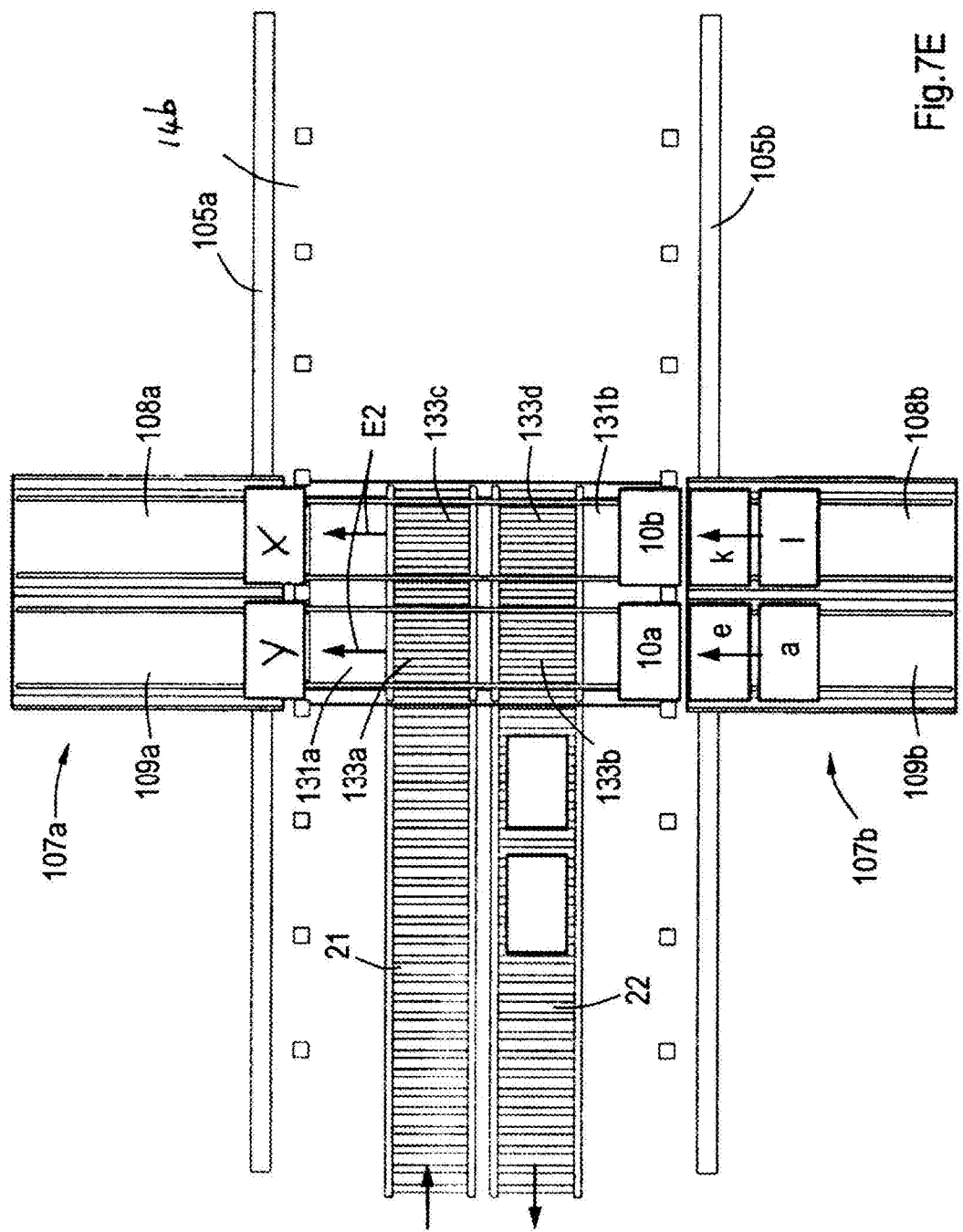

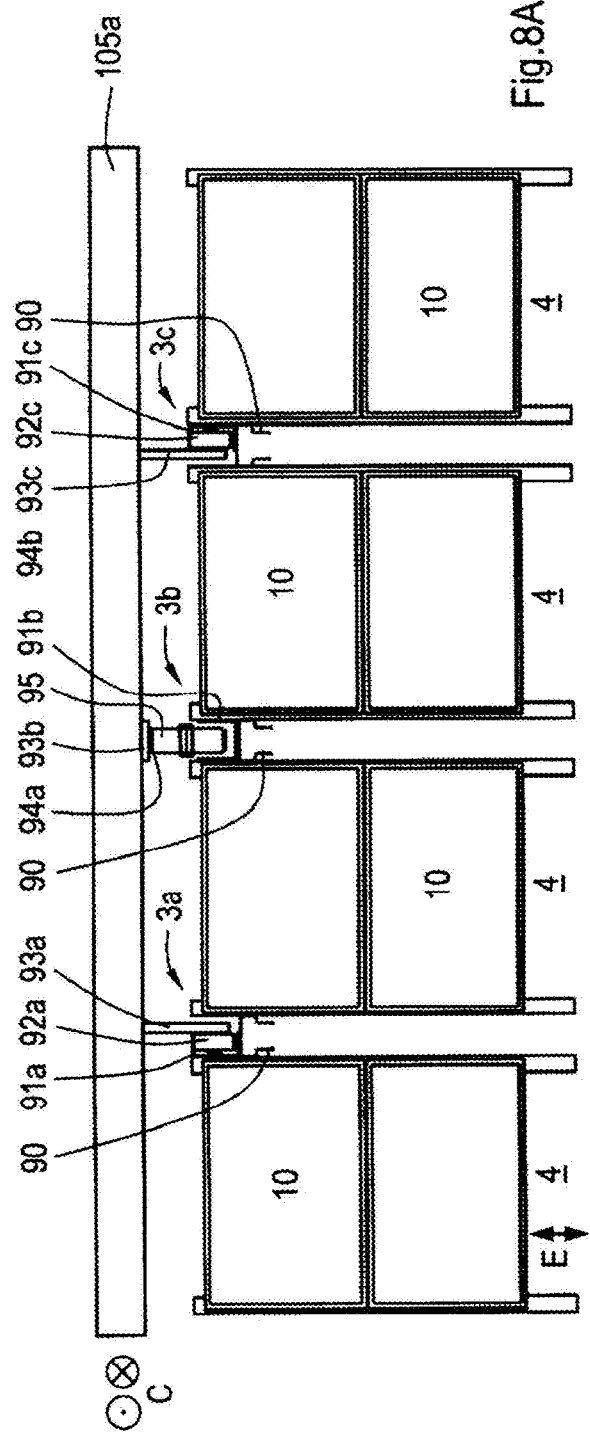
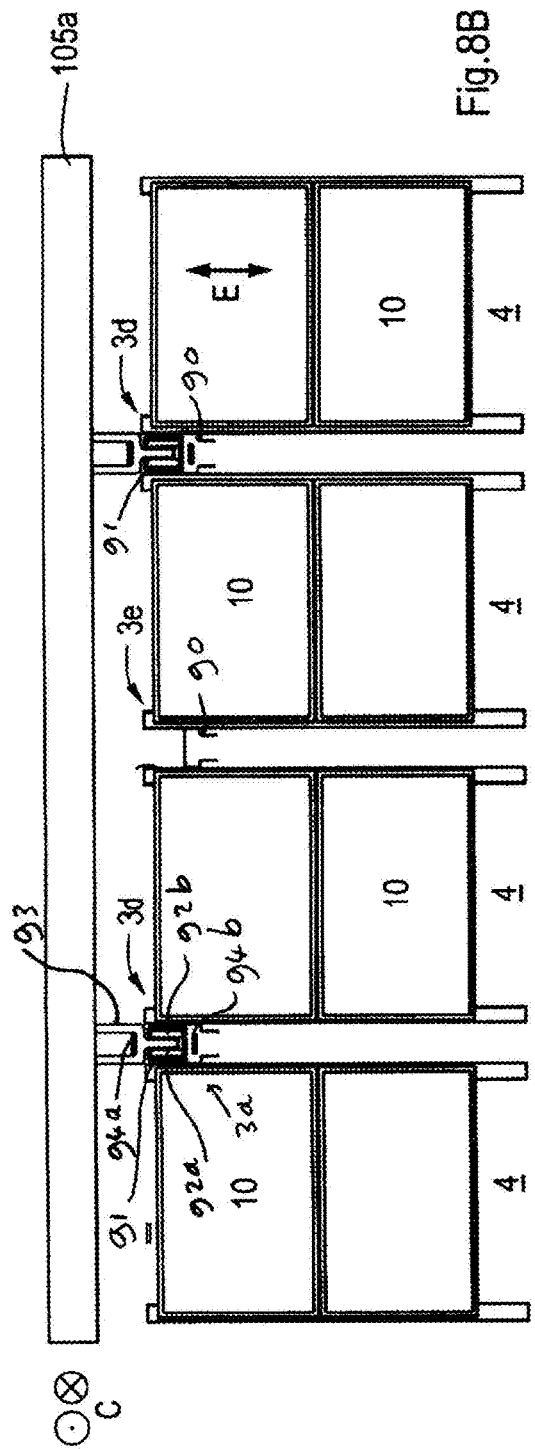

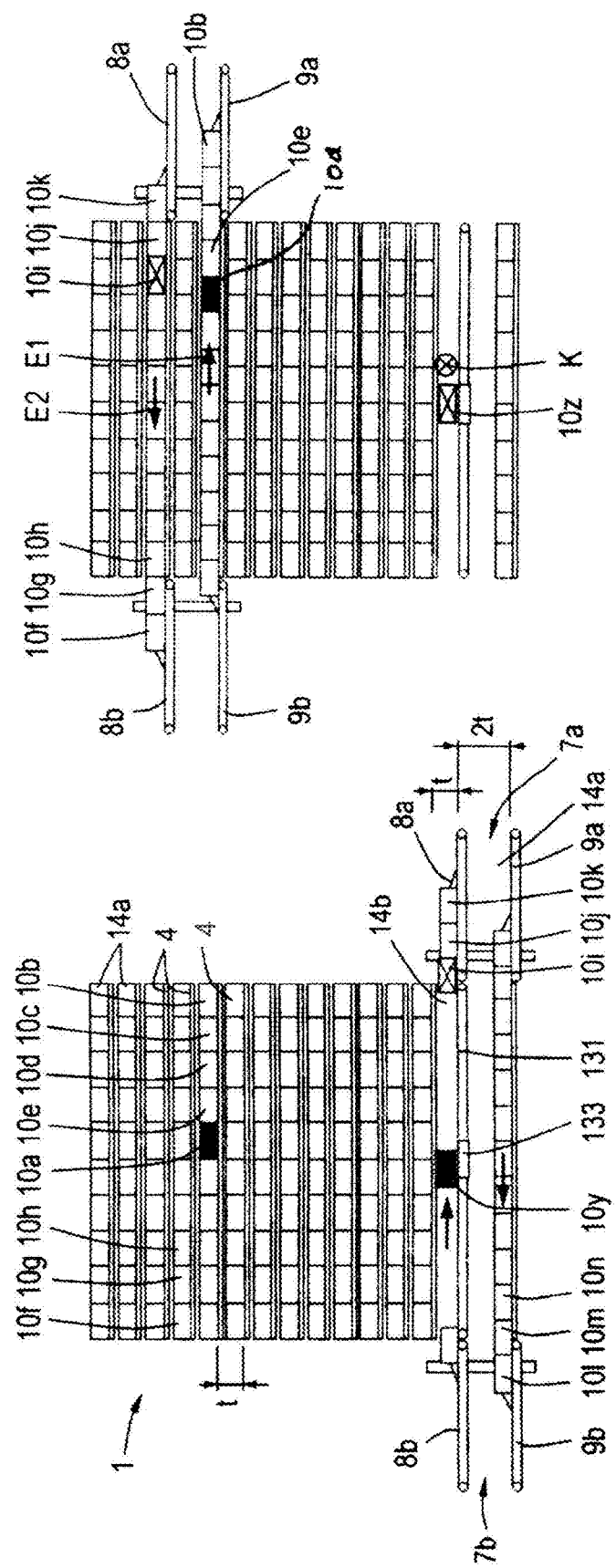

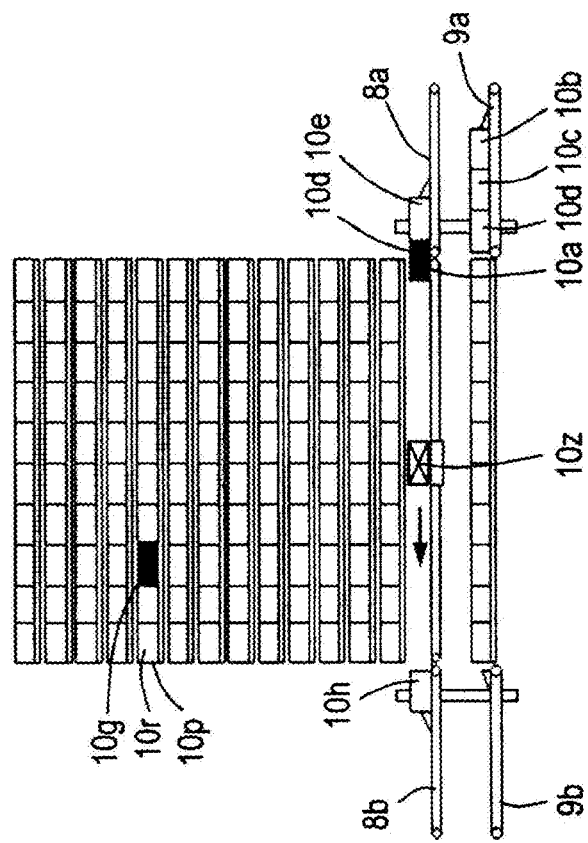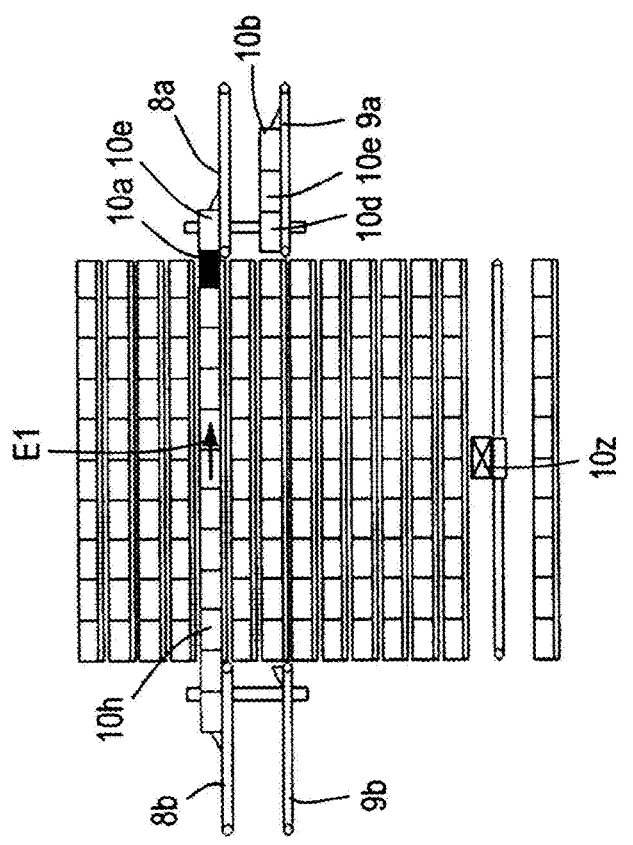

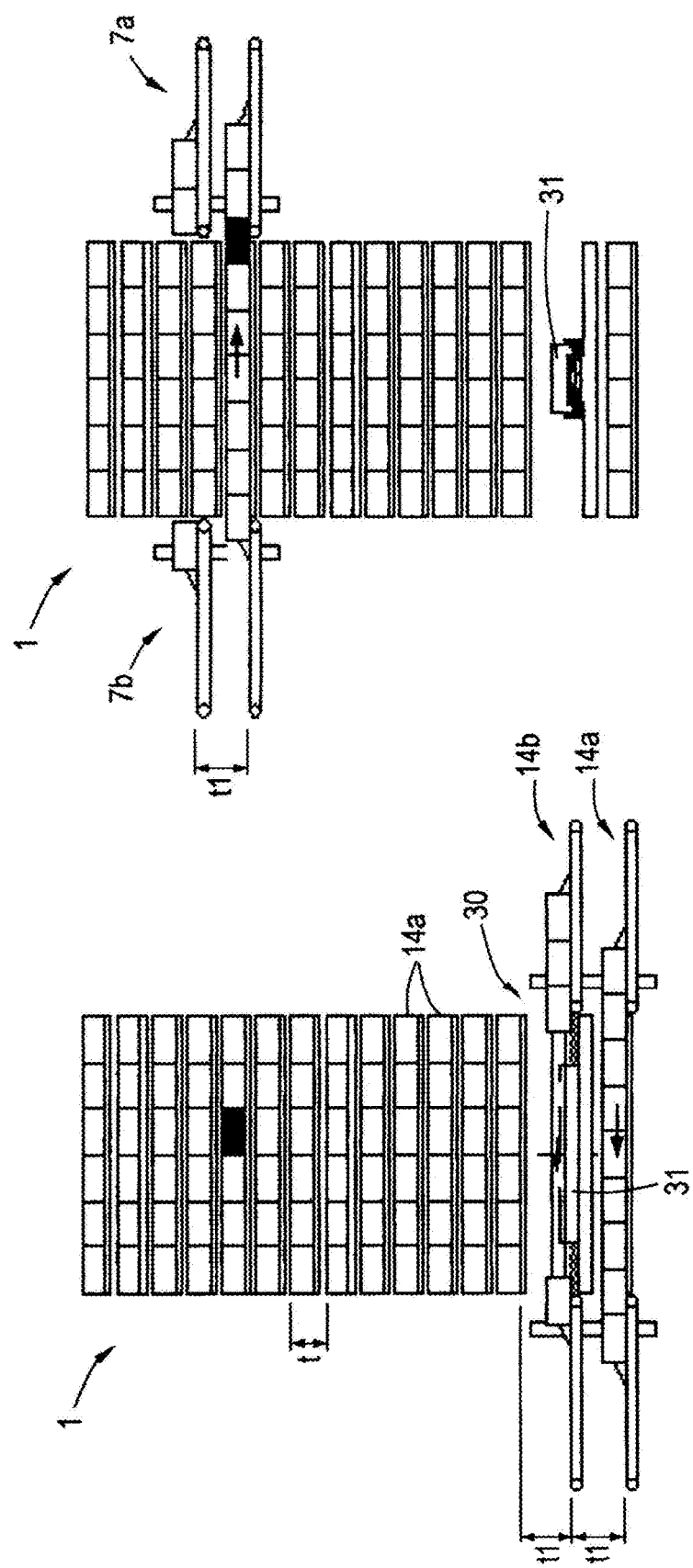

APPARATUS AND METHOD FOR MANAGING THE STORAGE OF ARTICLES

BACKGROUND OF THE INVENTION

The invention relates to a device for managing the storage of articles, automated to a large extent. The invention furthermore relates to a method for managing the storage of articles, automated to a large extent.

Devices for managing the storage of articles in a way that is automated to a large extent are known. Reference is being made to the international patent applications WO 2010/090512, WO 2012/018255 and WO 2012/134269. Such devices can advantageously be used in the storage and order picking systems of parts, consumer products, pharmaceutical products, and the like. This can be the case at the production site, in wholesale businesses or in retail businesses. Also internet shops and supermarkets can be thought of here.

Such devices can be sizeable. There is a need for systems mentioned in the preamble which occupy a limited amount of space available in storehouses, in a horizontal sense.

SUMMARY OF THE INVENTION

It is an object of the invention to provide a device of the kind mentioned in the preamble which has a size which can be limited in horizontal sense.

It is an object of the invention to provide a device of the kind mentioned in the preamble with which the managing of the storage of articles can be carried out in an efficient manner.

For achieving at least one of these objects the invention according to one aspect provides a device for keeping articles in temporary storage, comprising

- a frame having at least one series of mutually parallel, elongated storage sections, placed in a column set-up and extending between a first frame side and a second frame side of the frame,
- wherein the frame forms a series of storeys in which the series of storage sections have been accommodated,
- wherein the storage sections have been provided with holder supports on which series of holders, such as carriers, for the articles are supported,
- wherein at the first frame side and the second frame side, at least one first and at least one second platform, respectively, have been arranged, each platform being configured for receiving at least one holder,
- wherein the platforms can be moved by first movement means from a position in which both are aligned with one of the storage sections to a position in which both are aligned with another one of the storage sections,
- wherein the device has been provided with second movement means for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction,
- wherein the device comprises:
  - at least one entry track for entering holders into the frame and
  - at least one exit track for outputting the holders from the frame, and
  - a transfer device housed in a storey, and when considered in vertical projection on a horizontal plane, situated within the profile of the storage sections, which transfer device has third movement means for the holders for at a same level transferring holders from the entry track to one or more of the platforms and for transferring holders from one or more of the platforms to the exit track,
- wherein the platforms can be aligned with the transfer device by the first movement means for receiving holders therefrom and discharging holders thereto, respectively, and
- wherein the transfer device has been arranged for receiving a holder from the entry track and for discharging a holder to the exit track.

Because the transfer device, with which the holders are transferred from the entry track to the platforms and the holders are transferred from the platforms to the exit track, is located within the profile of the storage sections, the occupancy of space can be kept limited. The transfer device occupies vertical space indeed, but that does not have to be problematic in view of the fact that storehouses usually are tall buildings.

In one embodiment, one of the storeys of the device is free from storage sections and has been reserved for the transfer device. In said storey, there is room for several entry tracks and exit tracks and possibly several transfer devices, if desired.

The transfer device can be situated vertically between storeys with storage sections, due to which the vertical stroke length for the first movement means can be kept limited and pace can be increased. In one embodiment, the transfer device is situated in a storey that is situated approximately halfway the height of the device.

The transfer device can be positioned for receiving a holder from the entry track or for discharging a holder to the exit track, respectively, in second directions that are transverse to the first directions. Transfer between entry track and exit track and transfer device then takes place transverse to the storage sections. The entry track and the exit track can then connect to the sides of the frame that differ from the sides where the platforms have their working area. The working area of the platforms does not have to be limited then.

In an efficient embodiment the transfer device has been configured for receiving a holder from the entry track while simultaneously discharging a holder to the exit track.

In one embodiment having a frame with several column set-ups situated adjacent to each other, the entry track and/or the exit track comprise an interior path that connects to the transfer device and which is situated within the profile of the storage sections, when considered in vertical projection on a horizontal plane. The transfer device can be situated such that the location of transfer to the platforms is situated at a location approximately halfway the horizontal movement path of the platforms along the frame.

In general, the frame can comprise several column set-ups situated adjacent to each other, by which the storage capacity can be large. In that case, the first movement means take care of the movement of the platforms between/along the several column set-ups also.

In another, simple development of the device according to the invention, the frame has only one column set-up. In that case, the first movement means need to be configured for vertical movement of the platforms only.

In one embodiment of the device according to the invention, the entry track and/or the exit track have been positioned for entry and output, respectively, of holders at the third and fourth frame sides of the frame, which extend between the first and second frame sides, transverse thereto. The entry track and the exit track may be positioned for entry and exit, respectively, of holders at opposite frame sides of the frame. As a result, the freedom of design regarding the location and the and number of both tracks, in particular at entry and at exit of the device, is enhanced. In one embodiment, at the location of the connections to the transfer device the entry track is aligned with the exit track. Said connections may be situated approximately halfway between said first and second frame sides.

In general, it also possible that several entry tracks and exit tracks have been provided. In one embodiment, there is question of at least two sets of entry track+exit track aligned with each other at the location of the connections to the transfer device concerned. These sets may have been positioned for conveyance in mutually opposite direction, so that entry as well as exit can take place at two opposite sides of the frame. In one embodiment, the transfer device has been arranged for connection to each one of the sets entry/exit tracks.

Alternatively, the entry track and the exit track can enter and leave the frame at the same frame side, so that the opposite frame side can be situated against a wall.

If, in one embodiment, the third movement means can be operated in two opposite directions, the one or the platform can be used for receiving a holder from and discharge of a holder to the transfer device, respectively, as desired. If several transfer devices are present, these transfer devices can be configured for operation in opposite directions.

In a simple embodiment, the second movement means pertain to the platforms and, when holders are moved from and onto the transfer device, are part of the third movement means, wherein the third movement means comprise a coupling for transferring the motion of a holder from the platform to the transfer device to the holder at the other frame side, in order to shift that holder onto the other platform.

Then, the third movement means may comprise a slide structure, having a length corresponding with the distance between the platforms minus a holder length, and having a holder stop at both ends, wherein the slide structure can be moved in longitudinal direction over the distance of a holder, as a result of the pressure exerted against a holder stop by a holder slid from the platform onto the transfer device by the second movement means.

In one embodiment, the third movement means comprise the -functionally-connecting part of the (driven) entry track and/or the connecting part of the (driven) exit track, when they are aligned with each other, wherein a holder is forced onto the transfer device by the entry track while forcing a holder to be outputted from the transfer device, which holder is then discharged by the exit track.

In case of the above mentioned first direction and second direction transverse thereto, the third movement means may comprise a first and a second drive that are operational in the first and second direction, respectively. In a simple embodiment, the first or second drive comprise a track of driven rollers, wherein the rollers form a support surface for the holders. In that case, the second and first drive, respectively, comprise a rope belt drive, the rope belts of which drivingly engage the holders. The rope belt drive can be combined with a driven roller track easily. In one embodiment, the roller track and the belt drive are movable relative to each other between a position in which the roller track extends above the rope belts and a position in which the roller track extends below the rope belts. In an alternative embodiment, this can be applied to the rope belts in relation to the roller track. In one embodiment, in which the connection to the entry track and the connection to the exit track are situated near respective platforms, that is to say near the first and second frame sides, the third movement means may comprise the second movement means when the latter pertain to the platforms, with two coupled slides (coupled by means of the above mentioned rope belts, for instance) that are moved by sliding a holder from the one platform onto the support and simultaneously sliding a holder present on the support from that support, at the other side.

Alternatively, in case of the above mentioned first direction and second direction transverse thereto, the transfer device may comprise a converter rotatable about a vertical centre line, which converter has been provided with a support for one or more holders, wherein the third movement means comprise a drive for rotating the converter, preferably in selectively the one direction or the opposite direction, between a position for receiving a holder from the entry track and/or discharging a holder to the exit track and a position for discharging a holder to the one platform and receiving a holder from the other platform. In an active embodiment, the third movement means comprise one or more displacers for displacing the holders up onto the support and for displacing holders from the support. Slides or conveying rope belts or conveying rollers could for instance be considered here. In a simple, passive embodiment, use is being made of the second movement means when pertaining to the platforms, with two coupled slides that are moved by sliding a holder from the one platform onto the support and simultaneously sliding a holder present on the support from that support, at the other side.

In general, the second movement means, when these pertain to the platforms, may perform a function as third movement means, in case the third movement means comprise a slide structure having a length corresponding to the distance between the platforms minus a holder length, and having a holder stop at both ends, wherein the slide structure is movable in length direction over a holder length, due to the pressure exerted against a holder stop by a holder that that has been shifted from the platform onto the transfer device by the second movement means. As a result, the other holder stop will be moved over the holder length and the holder in front of it will be shifted onto the other platform. As already indicated above, the slide structure may comprise two coupled slides as holder stops, wherein the slides may form one unity with each other or can be mounted n rope belts or the like.

The support may form part of a rotating disc. By the rotating disc, conversion in transfer direction can take place in a reliable and simple manner.

The device according to the invention may be provided with a control system for controlling the first, second and third movement means. In one embodiment, the control system has been configured for synchronously driving the second and third movement means and in the same direction driving the second and third movement means, insofar as they do not already coincide. In one embodiment, the third movement means can be controlled for pre-positioning the holder, at the first or second frame side, so that when the platforms have been brought in front of the transfer device, a quick transfer can take place and thereafter the transfer device is available for other displacements.

From another aspect, the invention provides a device for keeping articles in temporary storage, comprising a frame having at least one series of mutually parallel, elongated storage sections, placed in a column set-up and extending between a first frame side and a second frame side of the frame, wherein the frame forms a series of storeys in which the series of storage sections have been accommodated, wherein the storage sections have been provided with holder supports on which series of holders, such as carriers, for the articles are supported, wherein at the first frame side and the second frame side, at least one first and at least one second platform, respectively, have been arranged, each platform being configured for receiving at least one holder, wherein the platforms can be moved by first movement means from a position in which both are aligned with one of the storage sections to a position in which both are aligned with another one of the storage sections, wherein the device has been provided with second movement means for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction, wherein at least two first platforms and at least two second platforms, respectively, have been disposed at both frame sides, wherein the at least two first platforms are part of a first platform unit that can be moved as one unity and wherein the at least two second platforms are part of a second platform unit that can be moved as one unity, wherein the first and the second platform units can be moved by the first movement means from a position in which a pair of first and second platforms are aligned with one storey of the frame and/or with one of the storage sections and another pair of first and second platforms is aligned with another storey of the frame and/or another one of the storage sections, to a position in which the one pair of first and second platforms is aligned with another storey of the frame and/or another one of the storage sections and the other pair of first and second platforms is aligned with a storey of the frame deviating therefrom and/or a storage section deviating therefrom.

The plural platform set up at both frame sides permits a displacement of holders according to plural, parallel tracks, in first directions, in directions opposite thereto, or in first and opposite directions. The number of displacements of the platforms required for entry and exit of holders to and from the device can be kept limited. As a result, speed can be gained.

The plural platform set up can also improve the process of retrieving the holders from the storage sections. To this end, in one embodiment, the first and the second platform units can be moved by the first movement means from a position in which a pair of first and second platforms is aligned with one of the storage sections, and another pair of first and second platforms is aligned with another one of the storage sections, into a position in which the one pair of first and second platforms is aligned with the said other one of the storage sections and the other pair of first and second platforms is aligned with a storage section deviating therefrom.

Here, the working range of the platforms of the one pair can, at least in part, preferably completely, coincide with the working range of the platforms of the other pair.

Hereby it will be possible to circulate the holders on the platforms and the storage sections connecting thereto by a limited number of displacements of the platforms. Said circulation may, for instance, be desirable for efficiently retrieving a holder with articles from storage which is situated in said other storage section at a distance from the ends of that storage section, for instance near the middle thereof. By the circulation the older can be quickly, stepwise, moved to the desired end of the (other) storage section and be received by the platform.

In one embodiment, the second movement means for the one pair of first and second platforms situated opposite each other can be operated independently of the second movement means for the other pair of first and second platforms situated opposite each other. Thus, the second movement means of the one pair can be activated and the second movement means of the other pair not or later (whether or not for a period of time coinciding) or for a displacement over another distance or for a displacement in opposite directions. By way of example, the one pair of platforms can be activated for discharge/reception of two holders in the one direction, and the other pair of platforms be activated for discharge/reception of three holders in opposite direction or in the same direction.

In a single column set up the storage sections concerned are situated above one another and thereby the platforms within a platform unit will also be situated above one another, in a simple embodiment two platforms, at a fixed spacing. Also in a plural column set up such platform units can be provided. The vertical spacing between the platforms can correspond to the spacing between the storage sections.

The platform units with platforms situated above one another may be borne by an auxiliary frame extending over the length of the first and second frame sides, so as to be reciprocally movable in horizontal direction, which auxiliary frame can be moved up and down along the first and second frame sides and is part of the first movement means.

For servicing storage sections that are situated parallel to one another in a horizontal plane, the platform units may comprise platforms that are situated next to each other. In that way, several discharge/reception actions can be performed at the same time at one storey level, or as the case may be at/to two opposite sides or to/from the same side. This offers plenty of variation possibilities for the operation of the device and can improve the speed of the process.

A combination of platforms situated horizontally adjacent one another with platforms situated above one another in one and the same platform unit is possible, for instance in platform units each having four platforms, each time horizontally aligned with each other within a pair.

In one embodiment in which within the platform units the platforms are situated at a fixed distance from one another, within the storeys all storage sections are situated in horizontal direction at a fixed centre-to-centre distance from each other, corresponding with the centre-to-centre distance of the platforms within the platform units. In this case too, the platform units may be borne by an auxiliary frame extending over the length of the first and second frame sides, so as to be reciprocally movable in horizontal direction, which auxiliary frame can be moved up and down along the first and second frame sides and is part of the first movement means.

In one embodiment, in which the frame comprises columns situated at the first and second frame sides, spaced apart from the corners of the frame, and situated between the storage sections, and the columns apart from a supporting function also have to fulfil a guiding function in guiding the auxiliary frame, and optionally also have to fulfil a guiding function for a drive member for the vertical movement of the auxiliary frame, such as a cable or a rope belt, the column functions have been divided over first column parts for the guiding function and second column parts for the supporting function, wherein the first and second column parts are situated next to each other in extension direction, that means transverse to the first and second frame sides. Due to this functional separation the columns can be designed narrow, so that the intermediate spacing between the storage sections can be kept small.

In one embodiment, the first movement means have been configured for moving the platform units in horizontal direction to beyond the series of storage sections in a storey, in one direction, preferably in both directions, so that all platforms situated next each other can reach the outermost storage sections for transfer of holders thereto or reception of holders therefrom. In that case the columns situated at the corners of the frame may have a width that corresponds to the width of the columns in the first and second frame sides. In case of platform units having two platforms situated next to each other, the movement means, in particular said auxiliary frame, will extend horizontally until one platform width to beyond the series of storage sections. In case of more than two platforms (namely n) situated next to one another this may be over a distance of (n−1)×platform width.

The above discussed device having platform units with a plurality of platforms may be provided with at least one transfer device for at the same level transferring holders from an entry track to one or more of the platforms and for transferring holders from one or more of the platforms to an exit track,
  wherein the platforms can be aligned with the transfer device in question by the first movement means for receiving holders therefrom and discharging holders thereto, respectively, and
  wherein the transfer device in question has been arranged for receiving a holder from the entry track and for discharging a holder to the exit track,
  wherein the at least one transfer device has been provided with third movement means for the holders for transferring holders from the entry track to one or more of the platforms and for transferring holders from one or more of the platforms to the exit track.

The one or mote transfer devices may be situated outside the frame, in the direct vicinity of the frame.

In the alternative, it s possible that at least one of the storeys of the frame has been provided with a transfer device housed in said storey and, when considered in vertical projection on a horizontal plane, situated within the profile of the storage sections, in particular a transfer device as discussed above, also according to claim 1 and further.

In an efficient embodiment, in which several transfer processes can be carried out in parallel, the transfer device is configured multiple, one transfer device for each pair of first and second platforms, wherein, preferably, the third movement means of each transfer device can be operated independently of those of the other transfer device. This approach is in particular advantageous in case of platform units with platforms situated next to one another, because the transfer devices can then be accommodated in the same storey.

In case of platform units with platforms situated above one another, the first and the second platform units can also be moved by the first movement means from a position in which a pair of first and second platforms are aligned with one of the storage sections and another pair of first and second platforms are aligned with the transfer storey for discharging holders thereto/receiving holders therefrom.

With a vertical mutual distance between at least almost all storeys being t, the vertical mutual distance between the two first platforms and the two second platforms, respectively, can be n×t, wherein n belongs to N. In a compact embodiment, n equals 2.

In the case in the column set-up with transfer storey, in particular above described transfer device, a storage section is situated directly below or directly above, respectively, the transfer storey, said storage section can be situated below or above, respectively, the transfer storey at a distance corresponding with the vertical mutual distance of the platforms. Hereby it will be possible to always use the lowest or the highest storage section in combination with receiving holders from or discharging holders to a transfer storey.

In a first development hereof, in which the vertical mutual distance between the platforms is n×t, the transfer storey is situated at a vertical distance of t or n×t (the platform distance) below the storage section situated above it or the storage section situated below it, respectively.

In a second development, I which, too, a storage section is situated below or above, respectively, said transfer storey, the transfer storey is situated at a vertical distance of t1 below the storage section situated above it or above the storage section situated below it, respectively, which distance t1 deviates from a full number of times the said mutual distance t, and wherein the transfer storey is situated at the same distance t1 from the storage section situated below or above the transfer storey, respectively, wherein the vertical mutual distance of the platforms is also t1. In this case, t1 can be between t and 2t, due to which the structural height of the tandem platforms can be kept limited. A drawback is that with the tandem platforms the platforms cannot be brought in line with two storage sections that are situated above one another at the same time, however, it will be possible to align the other platforms with a desired storage section by a small vertical displacement. Because both platforms can be aligned with the transfer storey and the storage section situated there above or there below at the same time indeed, there are still several local possibilities for manipulation of holders.

In an advantageous embodiment with platform units having platforms situated next to each other, the transfer device has been arranged with parallel connections of entry track and exit track or with several aligned sets of entry tracks/exit tracks, as described above.

the first platform unit two first platforms are situated straight above one another and wherein in the second platform unit two second platforms are situated straight above one another, wherein, preferably, the first and the second platform units can also be moved by the first movement means from a position in which a pair of first and second platforms are aligned with one of the storage sections and another pair of first and second platforms are aligned with the transfer storey for discharging holders thereto/receiving holders therefrom.

The exit track may have been provided with an adjacently positioned standby location or standby track, having a transfer device for transferring a holder from the exit track to the standby location or standby track and back again. Herewith, the sequence of two holders that have been transferred more or less simultaneously from the double platform units to a single exit track can be influenced, by putting a leading holder aside, in a standby position, and then letting the next holder pass it and then putting the initially leading holder back again on the exit track.

In general, in an embodiment in which retrieving, from the one or more series of storage sections, one or more holders having mutually equal lengths can be carried out in an efficient manner, and the maximum number of holders in a storage section is n1 and the maximum number of holders on a platform is n2, n1 can be equal to 2× n2 or be smaller than 2× n2. Hereby, a holder can be taken out from a storage section in one stroke of the of the second movement means, to the platform at the one (first or second) frame side or to the platform at the other (second or first) frame side. This can be applicable to each one of the devices and processes discussed in the present summary of the invention(s) in the patent application.

Alternatively described, the storage length on the storage sections can be equal to twice the storage length of a platform, or smaller.

In accordance herewith the invention provides, from another aspect, a device for keeping articles in temporary storage, comprising a frame having at least one series of mutually parallel, elongated storage sections, placed in a column set-up and extending between a first frame side and a second frame side of the frame, wherein the frame forms a series of storeys in which the series of storage sections have been accommodated, wherein the storage sections have been provided with holder supports on which series of holders, such as carriers, for the articles are supported, wherein at the first frame side and the second frame side, at least one first and at least one second platform, respectively, have been arranged, each platform being configured for receiving at least one holder, wherein the platforms can be moved by first movement means from a position in which both are aligned with one of the storage sections to a position in which both are aligned with another one of the storage sections, wherein the device has been provided with second movement means for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction, wherein the holders have mutually equal lengths wherein the maximum number of holders on a platform is n2, wherein n1 is equal to 2×n2 or is smaller than 2×n2.

The manner of storage in a storage system with storage sections and holders to be stored therein can vary. It is possible to use the whole storage system for articles of one kind. It is also possible to use the storage system for a plurality of kinds of articles and therewith reserve one or more storage sections for articles of one kind and one or more other storage sections for articles of another kind. A drawback of this can be that the storage system's capacity is not made better use of.

An object of the invention is to provide a method by which a relatively large number of kinds of articles can be stored in a relatively limited number of storage sections and can be retrieved therefrom in an efficient way.

In accordance with the storage devices described in the above mentioned International patent applications, the holders can be stored in the device in storage sections which in the form of one or more columns have been placed in a frame and which extend between a first frame side and a second frame side of the frame, wherein the holders are taken to and retrieved from the storage sections by means of platforms that are disposed at and movable along first and second frame sides, wherein when discharging a holder to a selected storage section from the one platform, the holders already present are moved in a contiguous series over said storage section while discharging a holder to the other platform, wherein when retrieving a wanted holder from a selected storage section, a holder is discharged from the one platform to the selected storage section in order to move the holders already present in said storage section in a contiguous series over said storage section while discharging the wanted holder to the other platform. According to a further aspect of the invention, the holders with articles are placed freely in the storage sections, which have not been assigned to a specific type of article, wherein the content of the holders is saved in a control system of the storage device and the position of the holders therein is monitored. In that case it will not be necessary to gear to holders that were previously stored in the device, so that speed can be gained. Contrary to the case in which storage sections have been assigned to particular articles, the full storage capacity of the device can be made use of, whereas the assortment can be greater. The holders can be placed in the storage sections at random.

For retrieving a wanted holder situated in a selected storage section spaced apart from the first frame side or from the second frame side, holders situated between the wanted holder and the first or second frame side can be moved to another storage section in one or several cycles, until the wanted holder can be received on the platform in question. In a cycle such intermediate holders are moved from the selected storage section to the first or second platform, while receiving on the selected storage section, holders from the opposite platform. Then, the platforms are moved to another storage section, and the holders in between are discharged to the other storage section, while discharging holders from the other storage section to the other platform. The platforms are subsequently moved again to the selected storage section. When the wanted holder during a next movement of holders over the selected storage section still cannot be placed on the platform, the cycle is repeated once more with the holders in between, until the wanted holder can be received on the platform in question and be taken to the exit track. The holders situated on the selected storage section, between the wanted holder and the nearest platform can be displaced to the other storage section in one or more cycles. It is also possible to make use of several other storage section.

Due to the fact that the location of the holders and thus the location of the articles in the device is always known in the control device, the holders can be entered in the device at random. There is, as it were, question of a known chaos. The location of entry and/or the location of exit can be made dependent on the position of the (requested) holder to be retrieved. Because the location of the holders is always known, the displacements required for a cycle can be kept limited. In many cases it may not matter which other storage section is included in the cycle.

Here, the multiple platform units discussed above can be advantageous, because the displacements of the platforms can be kept limited that way. Exchange of holders may for instance take place between a selected storage section and an adjacent storage section or storage section located above or below it, and then, after displacement of the platform units over for instance one storage section pitch or storey pitch, exchange can take place between, again, the selected storage section (now with the other pair of platforms) and the storage section at the other side of the selected storage section. Also in view of the possible independent operation of the (second movement means of the) pairs of platforms with respect to each other (directions, length of displacement), many strategic possibilities will be available here.

According to another aspect, the invention provides a method with which a storage system including holders that are placed randomly in storage sections can be used in an efficient manner.

According to a further aspect the invention provides a method for managing a device for keeping articles in temporary storage,
- which device comprises a frame having at least one series of mutually parallel elongated storage sections placed in one or more column set-ups and extending between a first frame side and a second frame side of the frame, wherein the storage sections have been provided with holder supports on which series of holders, such as carriers, for the articles are supported, wherein at the first frame side and the second frame side of the frame, first and second platforms, respectively, have been arranged, each platform being configured for receiving at least one holder, which platforms can be moved from a position in which both are aligned with a storage section or both are aligned with a transfer device, to a position in which both are aligned with another one of the storage sections or (if that was not the case in the previous position) both are aligned with the transfer device, for transferring holders to and from the platforms,
- wherein discharging one or more holders from a platform to a storage section is combined with discharging a same number of holders from said storage section to the opposite platform while moving the series of holders present in the storage section and situated between both holders, accordingly,
- wherein the platforms are moved along the storage sections by the first movement means,
- wherein the holders are moved in the longitudinal direction of the storage sections by second movement means,
- wherein the first and second movement means are controlled by a control system,
- wherein upon being accommodated in the device, the holders and articles (type, number) are registered in the control system,
- wherein each movement of holders is registered in the control system,
- wherein taking articles into storage is combined with retrieving articles from storage, wherein the method comprises the steps of:
  a—entering into the control system a request for retrieving from the device one or more article(s) held by a specific—wanted—first holder,
  b—having the control system select the storage section and the location therein of the wanted holder,
  c—having the control system determine from which of the first and second frame sides the wanted holder will be retrieved, preferably the first or second frame side closest to the wanted holder, to be called selected frame side,
  d—receiving on a platform a holder to be taken into storage,
  e—using the holder to be stored and the holders in the selected storage section, and if required also other holders in the device, as displacer, in relation with using the first and second movement means, for realizing the movement of the wanted holder which is required to take this holder from the selected storage section onto the platform at the selected frame side,
  x—moving both platforms from the selected storage section into a position aligned with the transfer device.
  y—discharging the wanted holder from the platform to the transfer device at the selected frame side, while at the opposite frame side, from the transfer device, receiving on the other platform, a (second) holder to be stored in the device.

Here, a stroke with the platforms for the entry of a holder in the storage system can be combined with a stroke for the discharge of a wanted holder from the storage system, so that maneuvering time can be saved on. Decisive for the process is the location in the device of the wanted holder, wherein other holders in the device serve as displacer, in order to achieve the wanted displacements of holders. In this process, the holders present on the platforms can perform a function as well. The location of the holders remains known in the control system. Therewith, the holders are in a kind of dynamic storage. All holders can be provided with articles. The articles may differ per holder or be equal per holder, and then in a number differing per holder, for example.

It may be that with the holder accommodated for storage and possible other holders already present on the platforms in step d), the wanted holder can be put onto the platform at the selected frame side by one stroke of the second movement means. In that case, both platforms can be brought to the selected storage section directly after step d). This can also be the case, for instance, with above mentioned ratio between length of storage section and length of platforms in connection with the holder lengths, herein the maximum number of holders in a storage section is n1 and the maximum number of holders on a platform is n2, and n1 equals 2×n2 or is smaller than 2×n2.

It may also be that this is not the case. In that case, preliminary work can be done using holders in other storage sections and possibly the holders which in step d) are present on the platforms, before the wanted holder can be transferred to a platform at the selected frame side in a final displacement step on he selected storage section. In this process, the selected storage section can be used also, together with another storage section.

Depending on the location of the wanted holder and the presence of holders on the platform, after step d) first the pair of platforms may be taken to another storage section, for, in preliminary work, creating a set-up of holders on the platforms that can be used for the process of removing the wanted holder from the selected storage section. In this process, holders at said other storage section are moved and one or more holders are received thereon from a platform and are discharged from said storage section to an opposite platform. If required, this can be repeated at yet another storage section or at the selected storage section (if the wanted holder cannot be discharged in one go). Ultimately the platforms are then brought in front of the selected storage section for by means of the holders present on the platforms discharging the wanted holder to the platform at the selected frame side.

Alternatively, the selected storage section can be involved first, in said preliminary work, by discharging one or more holders from a platform to the selected storage section in order to bring the wanted holder closer to the selected frame side. Thereafter, the platforms are taken to another storage section, for creating a set-up of holders on the platforms that can be used for the process of removing the wanted holder from the selected storage section. If required, this can be repeated at yet another storage section or at the selected storage section (if the wanted holder cannot be discharged in one go). Ultimately, both platforms can be taken to the selected storage section again for by means of the holders present on the platforms discharging the wanted holder to the platform at the selected frame side.

The process can be repeated for the next holders to be retrieved and to be entered.

In these processes, advantageous use can be made of the above described platform units having multiple platforms, whereby the displacements can be kept limited and processes can be accelerated, as explained above.

By way of example, using platform units having two pairs of platforms, in one process one or two holders to be stored can be entered in the storage sections and one or two holders to be retrieved can be taken out from the device.

By way of example, when retrieving a first of two wanted holders which are located in different storage sections, some preliminary work can already be done to have the subsequent retrieval of the second wanted holder take place as advantageously as possible, before the platform units with both wanted holders are taken to a transfer device for discharge of those holders. Here, it may be possible that the one wanted holder is situated on a platform at the one frame side and the other wanted holder is situated on a platform at the other frame side. However, this can also be the case at the same frame side and, if convenient, for instance with two wanted holders originating from different storage sections, on the same platform. Because of the preliminary work coinciding with a part of the retrieval process of the preceding wanted holder, speed can be gained.

Preliminary work can be done when retrieving one wanted holder, for the benefit of the retrieval of a subsequent holder to be retrieved. The position in the storage section in question of that next wanted holder is known. In the last stroke or in the last strokes at the storage section in question for ultimately transferring the first wanted holder onto the wanted platform of the one pair of platforms, a number of holders is transferred onto the one platform of the other pair of platforms, said number being optimal for bringing the next wanted holder onto the other platform of the other pair of platforms in as few strokes as possible.

Here, it may be that the holders present on the one platform of the other pair of platforms are sufficient for transferring, using those holders, the next wanted holder from the storage section concerned to the other platform of the other pair of platforms in one stroke. In that case that can be done directly, after which both wanted holders can be delivered to the transfer device(s). If that is not the case, the approach can be followed to deliver the holder which is already placed on the platform to a transfer device first and then come back with the platforms in order to retrieve the next wanted holder, after one or more strokes at one or more storage sections. Here, however, preliminary work can be done again with a view on retrieving the subsequent next wanted holder in a manner as efficient as possible.

In these methods, advantageous use can be made of the length-ratio between platforms and storage sections described above.

The transfer device can be divided into a first and a second transfer station, operative at opposite frame sides, for reception/discharge of holders from/to platforms at the selected frame side and the opposite frame side.

From a further aspect, the invention provides a device configured for carrying out on or more of the methods, having a control system that has been programmed accordingly and that has been provided with means for tracking the location of the holders and optionally the articles as well and with means for calculating the sequence of use of the first and second movement means for retrieving tone or more wanted holders.

From a further aspect, the invention moreover provides a method for managing a device for keeping articles in temporary storage, which device comprises a frame having at least one series of mutually parallel, elongated storage sections placed in one or more column set-ups and extending between a first frame side and a second frame side of the frame, wherein the storage sections have been provided with holder supports on which series of holders, such as carriers, for the articles are supported, wherein at the first frame side and the second frame side of the frame, first and second platforms, respectively, have been arranged, each platform being configured for receiving at least one holder, which platforms can be moved from a position in which both are aligned with a storage section or both are aligned with a transfer device to a position in which both are aligned with another one of the storage sections or (if that was not the case in the previous position) both are aligned with the transfer device, for transfer of holders to and from the platforms, wherein discharging one or more holders from a platform to a storage section is combined with discharging a same number of holders from said storage section to the opposite platform while moving the series of holders present in the storage section and situated between both holders, accordingly, wherein the platforms are moved along the storage sections by first movement means, wherein the holders are moved in the longitudinal direction of the storage sections by second movement means, wherein the first and second movement means are controlled by a control system, wherein upon being accommodated in the device, the holders and articles (type, number) are registered in the control system, wherein each movement of holders is registered in the control system, wherein taking articles into storage is combined with retrieving articles from storage, wherein the method comprises the steps of:

a—entering into the control system a request for retrieving from the device one or more article(s) held by a specific—wanted—first holder, b—having the control system select the storage section and the location therein of the wanted holder, c—having the control system determine which of the first and second frame sides is closest to the wanted holder, to be called the selected frame side, d—moving both platforms to the selected storage section, x—transferring the wanted holder from the selected storage section onto the platform at the selected frame side while receiving on said storage section a holder from the platform at the opposite frame side, y—moving both platforms from the selected storage section into a position aligned with the transfer device, z—discharging the wanted holder from the platform to the transfer device at the selected frame side while at the opposite frame side from the transfer device, receiving on the other platform, a (second) holder to be stored in the device.

The process can be repeated for next holders which are to be retrieved and are to be stored.

If, in a first further development, in the steps a-c following step z the selected frame side for a next wanted holder is opposite to the frame side of the platform with the (second) holder to be stored, step d is carried out again, after step z and—as mentioned—the steps a-c. If it is then known in the control system that the second movement means cannot discharge the wanted holder(s) from the selected storage section to the platform at the selected frame side in one stroke, the following steps are carried out:

e—transferring the leading (third) holder from the selected storage section at the platform at the selected frame side while, from the platform at the opposite frame side, receiving on said storage section a same number of holders, including at least the (second) holder to be stored, f—moving both platforms from the selected storage section to another storage section and discharging to them at least the further (third) holder from the platform at the selected frame side while discharging a further (fourth) holder from the other storage section to the platform at the opposite frame side, g—moving both platforms back to the selected storage section and discharging to them at least the further (fourth) holder from the platform at the opposite frame side while discharging at least the then leading holder at the selected storage section to the platform at the selected frame side, h1—if the leading, then received, holder is the wanted holder, carrying out steps y and z, or h2—if the then received holder still is not the wanted holder, continuing to repeat steps e (in corresponding sense, now without the second holder), f and g, until the leading, then received, holder is the wanted holder, and subsequently carrying out step h1.

If, in a second further development, in the steps a-c following step z the selected frame side for a next wanted holder is equal to the frame side of the platform with the (second) holder to be stored, the following steps are carried out, after step z and—as mentioned—the steps a-c.

i—moving both platforms to another storage section (different from the currently selected storage section) and discharging thereto, from the platform, the (second) holder to be stored, while discharging at least a further (third) holder from said storage section to the platform at the opposite frame side, j—moving both platforms to the selected storage section and discharging thereto, from the platform, at least the further holder while discharging the leading holder from the selected storage section to the platform at the selected frame side, k1—if the leading, then received, holder is the wanted holder, carrying out steps y and z, or k2—if the then received holder is not the wanted holder, continuing to repeat steps i (in corresponding sense, now without the second holder) and j, until the leading, then received, holder is the wanted holder, and then carrying out step k1.

The required time of maneuvering can be kept limited if the said other storage section is an adjacent storage section. The required time of maneuvering can be kept limited if, in the repetition according to step h2 or step k2, the said other storage section always is the same storage section.

In an embodiment with multiple, in particular double platforms at each frame side (thus a platform unit with multiple first platforms and a platform unit with multiple second platforms), the required time of maneuvering can be kept limited if the said other storage section alternately is the one adjacent storage section and the other adjacent storage section.

The holders with articles can be placed in the storage sections independent on the kind of article accommodated therein, in the above mentioned random manner.

In one embodiment, the holder to be stored is entered in a storage section selected in concord with the position of a wanted holder to be retrieved. Starting from the knowledge of the location of the holders stored in the storage sections and the order concerning the holder to be retrieved, the control system determines an optimal place of delivery of the holder to be stored to the storages sections and an efficient program of movement of the platforms and displacement of holders on the storage sections for retrieving the wanted holder.

Preferably, the holders remain in the system. In one embodiment, all articles are taken out of the wanted holder and said holder is then stored again via the transfer device according to step z.

In an alternative embodiment, only a part of the articles is taken out of a wanted holder and said holder is then stored again via the transfer device according to step z.

In one embodiment, the platforms are able to receive/discharge several holders in one go and in at least one of the steps of transfer between platforms and storage sections/transfer device(s) several holders are discharged from and received by, respectively, the platforms.

Here too, the transfer device can be divided into a first and a second transfer station, respectively, operational at opposite frame sides, for receiving/discharging holders from/to platforms at the selected frame side and the opposite frame side.

In a further development, the first and second transfer stations form part of f a continuous entry/exit track, which just like the storage sections, supports a continuous series of holders and discharging/receiving one or more holders to/from the platforms takes place while moving the series of holders on the entry/exit track over a corresponding distance.

Here, placing holders on the entry/exit track for entry and removing holders from the entry/exit track for output takes place using an entry device and an exit device, respectively.

Preferably, the control system has holders to be stored, moved over the entry/exit track to the first or second frame side, in particular to the first or to the second transfer station, in dependency of the position of the requested holder/the requested article.

From another aspect, the invention provides a device for keeping articles in temporary storage, comprising a frame having at least one series of mutually parallel, elongated storage sections, placed in one or more column set-ups and extending between a first frame side and a second frame side of the frame, wherein the storage sections have been provided with holder supports on which series of holders, such as carriers, for the articles are supported, wherein at the first frame side and the second frame side, at least one first and at least one second platform, respectively, have been arranged, each platform being configured for receiving at least one holder, wherein the platforms can be moved by first movement means from a position in which both are aligned with one of the storage sections to a position in which both are aligned with another one of the storage sections, wherein the device has been provided with second movement means for, in a first direction, horizontally moving one or more holders from the platform at the first frame side of the frame to the holder supports of a selected storage section, while moving the series of holders supported thereon over the selected storage section and moving one or more holders from the storage section to the platform at the second frame side, and vice versa in a direction opposite the first direction, wherein the device comprises an entry/exit track with supports for the holders, which track extends between both frame sides, wherein the first movement means have been configured for aligning both platforms with the entry/exit track, wherein the device furthermore comprises an entry station and an exit station for entering holders or articles into the device by placing said holders on the entry/exit track or by placing said articles on the holders present on the entry/exit track, or for outputting holders or articles by taking holders from the entry/exit track or taking articles from the holders present on the entry/exit track, respectively.

The combination of the entry and exit track permits a relatively compact set-up. In addition, this offers possibilities for versatile further developments, to be discussed below.

Preferably, the entry and exit stations, which may be adjacent to one another or may coincide at least in part, comprise an entry device for the holders or the articles and an exit device for the holders or the articles, respectively.

In a first further, compact development the entry/exit track is situated within the column set-up, with the ends adjacent to the ends of the column set-up, within the movement profile of the platforms.

In a second, alternative, further development the entry/exit track is situated outside the column set-up, with the ends adjacent to the ends of the column set-up, within the movement profile of the platforms. This offers more freedom in the design of the entry and exit stations. Here, the entry/exit track may be straight. In the alternative, the entry/exit track may comprise bends or corners and may comprise at least one path that is spaced apart from the column set-up. Said entry device and/or said exit device may be spaced apart from the column set-up in order to create space at that location for other devices/persons. Moreover, herewith a buffer length for the holders can be provided, which may be desired, for instance, when the platforms have made several short strokes and as a consequence an accelerated discharge of holders from the frame has taken place.

In one embodiment, the entry/exit track has been provided with a drive for the supports in at least one track direction. The entry/exit track may then, if this track extends, preferably in a straight manner, between both frame sides, be used as an additional conveyor for the holders between both frame sides, as a kind of a bypass. After one or more articles have been taken out from the holders, the holders may then be fed back directly to one of the platforms and thereby moved to a wanted storage section.

In case the entry/exit track has been provided with a drive for the supports in two opposite track directions, selectively, one can choose to which frame side a holder is to be moved.

In a further development, the exit device is situated upstream of the entry device.

It is remarked that a storage system is known from British patent application 1.389.221, which system has a number of storeys each of which has a series of adjacent storage sections, wherein at each storey, at the sides of the ends of the storage sections, carriages are present that can be moved horizontally over tracks situated at those sides. The carriages are able to discharge a pallet to or receive a pallet from, respectively, a storage section, while displacing the pallet in said storage section. The displacement tracks have been continued at one end beyond the storage sections, in order to get in line with the entry/exit platforms, which are situated transverse to sides of the displacement tracks. The carriage can receive a pallet from or discharge a pallet to the entry/exit platforms. Elevators are present for moving a pallet from the one storey to another storey, which elevators have been positioned adjacent to the entry/exit platforms for reception of a pallet from an entry/exit platform or transferring a pallet thereto.

It is remarked that a storage system is known from Japanese utility model 04-042104, which system has a number of storeys each of which has a series of adjacent storage sections, wherein platforms are present at two opposite frame sides, which platforms can be moved up and down along those sides and from which carriers can be discharged to the storage sections or from which carriers can be received, while moving carriers in the storage section. The platforms can be brought in line with entry/exit conveyors situated at the same frame sides.

Articles can be stored with several identical articles per holder. Depending on the order to be picked, a holder may be emptied completely or just in part. An order may also consist of the contents of several holders plus a part of one holder. The holder which has only been emptied in part, has to be taken into storage again. However, this requires displacements in the storage device again. Moreover, a position in the storage device will thus be occupied by a holder having relatively fewer articles than other holders have.

An object of the invention is to provide a set-up and a method by which in such cases management of storage can take place in an efficient manner.

From a further aspect, the invention provides to that end an assembly of a main device and an auxiliary device for keeping articles in temporary storage, wherein the main device and the auxiliary device each comprise a frame having at least one series of mutually parallel storage sections placed in one or more column set-ups and extending between a first frame side and a second frame side of the frame concerned, wherein the frame forms a series of storeys in which the series of storage sections have been accommodated, wherein the storage sections have been provided with holder supports on which series of holders, such as carriers, for the articles are supported, wherein the main device has a main track having an exit track for outputting holders from the main device for removing articles out of the holders, and an entry track for entering holders into the main device, wherein the auxiliary device has an auxiliary track having an exit track for outputting holders from the auxiliary device for removing articles out of the holders, and an entry track for entering holders into the main device, wherein the assembly furthermore comprises a first transfer device for transferring holders from the main track to the auxiliary track and a second transfer device for transferring holders from the auxiliary track to the main track.

Herewith, a buffer storage of the auxiliary device is provided in addition to the main storage space of the main device, with the possibility of transferring a holder placed on the exit track and from which a number, but not all, articles have been removed, to the auxiliary track and then to store this holder in the auxiliary device. Such only partly filled holders may then be stored separately and be retrieved and outputted on the auxiliary track when that suits in an order which is to be processed, in an advantageous manner. In other words, such holders may be kept standby in the buffer storage, whereby an optimal operation of the main storage is promoted. The holders that are emptied as yet can be transferred again to the main track and are entered into the main storage, whether or not after having been passed along a filling station where they are filled again with articles.

In a further development the assembly according to the invention comprises a removal device placed upstream of the first transfer device and/or the second transfer device, for removing articles from holders on the main track and/or holders on the auxiliary track.

In a further development the assembly according to the invention comprises first means for detecting the loading degree of a holder on the main track and with a first control device for the first transfer device, which controls the first transfer device in dependency of the first detection means for allowing empty holders to pass through on the main track or transferring only partially loaded holders from the main track to the auxiliary track.

The assembly may be provided with second means for detecting the loading degree of a holder on the auxiliary track and with a second control device for the second transfer device, which controls the second transfer device for allowing only partially loaded holders to pass through on the auxiliary track or transferring empty holders from the auxiliary track to the main track.

In an embodiment which is efficient in terms of the use of space, the auxiliary device with the auxiliary track is situated in a space bounded by the main track and the main frame.

The auxiliary track may form at least almost a circular track.

In a simple and a more compact embodiment, the main track and the auxiliary track may have a parallel path at the location of the first and second transfer devices.

The main track and the auxiliary track may have a parallel path at the location of the removal device. It may then be possible to serve holders on both tracks by one single removal device.

The auxiliary device serves as a buffer for only partially loaded holders, so that the storage capacity for holders in the main device may be larger than the storage capacity of the auxiliary device, preferably, at least a few times larger.

In a compact embodiment, the storage sections of the auxiliary device are parallel to the storage sections of the main device.

In accordance with the storage devices described in the above mentioned International patent applications, at least one first and at least one second platform may have been arranged in the main device at the first frame side and the second frame side of the main frame, respectively, each platform being configured for receiving at least one holder, which platforms can be moved by first movement means from a position in which both are aligned with one of the storage sections to a position in which both are aligned with another one of the storage sections, wherein the main device has been provided with second movement means for, in a first direction, horizontally moving one or more holders from the platform at the first frame side of the main frame to the holder supports of a selected storage section, while moving the series of holders supported thereon over the selected storage section and moving one or more holders from the storage section to the platform at the second frame side of the main frame, and vice versa in a direction opposite the first direction.

In an efficient embodiment, the entry track and the exit track of the main track are situated within the reach of the first and second platforms for transfer to and receipt of holders, respectively.

In accordance with the storage devices described in the above mentioned International patent applications, the main device may have third and fourth, opposite, main frame sides extending between first and second main frame sides of the main frame, where the platforms are operational, wherein the main track is situated at the third main frame side and at the fourth main frame side an entry for loaded holders and/or a discharge for empty holders to be filled again, are situated.

Analogously, at least one first and at least one second platform may have been arranged in the auxiliary device at the first frame side and the second frame side of the auxiliary frame, respectively, each platform being configured for receiving at least one holder, which platforms can be moved by first movement means from a position in which both are aligned with one of the storage sections to a position in which both are aligned with another one of the storage sections, wherein the auxiliary device has been provided with second movement means for, in a first direction, horizontally moving one or more holders from the platform at the first frame side of the auxiliary frame to the holder supports of a selected storage section while moving the series of holders supported thereon over the selected storage section and moving one or more holders from the storage section to the platform at the second frame side of the auxiliary frame, and vice versa in a direction opposite the first direction.

The auxiliary device can be configured in accordance with the device according to the claims accompanying this disclosure.

In accordance with the foregoing, the invention, from a further aspect, provides a method for keeping articles in storage and retrieving them from storage, wherein the articles are kept in holders, wherein a main device and an auxiliary device are available for storage, wherein articles are stored in the main device in one or more groups of holders, wherein per group the holders contain an identical number of items of a specific article, wherein in the auxiliary device articles are stored in holders, which holders contain fewer items of the specific article than the holders in the main device do, wherein the position of the holders and the number of articles in the holders is monitored, wherein for retrieving a group of articles of the wanted type from storage, it is determined with which holder or holders the number of said group can be achieved, with holders from the main device, with holders from the auxiliary device or with a combination of the two, after which the thus selected holders are taken out of the main and auxiliary device in question, the selected holders are passed along a removal station and at that location the wanted articles are taken out of the holders, in order to achieve the number of the group, wherein a holder, emptied in the removal station, is taken back to the main device and wherein a holder that is partially filled after the removal station, is supplied to the auxiliary device and stored therein.

In accordance with the storage devices described in the above mentioned International patent applications, the holders may be stored in the main device in main storage sections, which in the form of one or more columns have been placed in a main frame and which extend between a first frame side and a second frame side of the main frame,
  wherein the holders are taken to and retrieved from the main storage sections by means of platforms arranged at and movable along both frame sides,
  wherein when discharging a holder from the one platform to a selected main storage section, the holders already present are moved in a contiguous series over said main storage section while discharging a holder to the other platform,
  wherein when retrieving a wanted holder from a selected main storage section from the one platform, a holder is discharged to the selected main storage section in order to move the holders already present in said main storage section in a contiguous series over said main storage section while discharging the wanted holder to the other platform.

In one embodiment, a similar approach can be followed for the auxiliary device, to which purpose a repetition of the preceding paragraph is to be considered inserted here, however with "main device", "main storage section" and "main frame" being replaced by "auxiliary device", "auxiliary storage section" and "auxiliary frame".

In one embodiment, one or more main storage sections are assigned to a specific type of article, in particular respective main storage sections are assigned to respective types of articles.

In an efficient embodiment, the platform at the first main frame side is exclusively used for moving loaded holders and the platform at the second main frame side is exclusively used for moving empty holders. Here, the platform at the first main frame side can be used when removing a loaded holder from the main device for supplying said holder to the removal station and/or the platform at the second main frame side can be used when supplying an empty holder, coming from the removal station, to the main device. Herewith it can be realized that always an article is available at one main frame side.

Preferably, the holders with articles are randomly, freely placed (RBS) in the auxiliary storage sections, which have not been assigned to a specific type of article. Tuning to holders previously stored in the buffer storage is not necessary, so that speed is gained. Unlike it is the case with storage sections assigned to specific articles, almost the whole capacity of the auxiliary device can be used, while the assortment can be greater. The period of storage will be short.

For retrieving a wanted holder that is situated in an auxiliary storage section spaced apart from the first or the second frame side, the holders situated between the wanted holder and the first or second end can be moved to another storage section in one or several cycles, until the wanted holder can be received at the platform in question. In a cycle, such intermediate holders are moved from the selected storage section to the first or second platform, while holders are received on the selected storage section from the opposite platform. Then the platforms are moved to another storage section, and the intermediate holders are delivered to said another storage section, while delivering holders of said another storage section to the other platform. Thereafter, the platforms are being moved again to the selected storage section. When the wanted holder still cannot be moved onto the platform in a next displacement of holders over the selected storage section, the cycle is being repeated with the intermediate holders, until the wanted holder can be received on the platform concerned and can be taken to the exit track.

The holders on the selected auxiliary storage section, between the wanted holder and the platform situated closest thereto, can be moved to the other auxiliary storage section in one or several cycles.

From another aspect, the invention provides a method for keeping articles in storage and retrieving them from storage,
  wherein, via an entry, articles are stored in a main device comprising a main frame having at least one series of mutually parallel main storage sections placed in one or more column set-ups and extending between a first frame side and a second frame side of the main frame,
  wherein the articles are stored in holders, with several articles per holder,
  wherein the holders with the various articles are stored in the main storage sections, and are moveable in there in longitudinal direction of the storage section from the first frame side to the second frame side and vice versa,
  wherein for retrieving a first group of s1 items of a wanted articles from storage, the following steps are taken:
    a—one or more items of wanted holders in which said wanted articles have been accommodated, are moved from the main storage section in question to an exit,
    b—the one or more wanted holders are passed along a removal station and at that location the wanted articles are taken out of the wanted holders,
    c1—a wanted holder, emptied in the process, is then passed back to a storage section in the main device, and
    c2—a wanted holder, partially emptied in the process, is supplied to an auxiliary device comprising an auxiliary frame having at least one series of mutually parallel auxiliary storage sections placed in a column set-up and extending between a first frame side and a second frame side of the auxiliary frame,
      wherein the partially emptied holder is received in an auxiliary storage section and is movable in there in longitudinal direction of the auxiliary storage section from the first auxiliary frame side to the second auxiliary frame side and vice versa,
      wherein for retrieving a second group of s2 items of the wanted article from storage, one of the following processes d1, d2, d3 or d4 is followed:
    d1—in case in the main storage sections n1 holders together contain s2 items of the wanted article, carrying out the steps a, b and c1 for those holders;
    d2—in case the holders present in the main storage sections contain fewer than the number s2 of wanted articles, but one or more (n2) holders with the wanted articles are indeed present, in number of s3 items and furthermore the holders present in the auxiliary storage sections contain at least s2-s3 wanted articles, carrying out the steps a,b and c1 for n2 holders and carrying out the following steps:
    e—one or more holders (n3) with a total of s2-s3 wanted articles are moved from one or more auxiliary storage sections in question to an exit,
    f—the one or more wanted holders are passed along the removal station and at that location the wanted articles are taken out of the wanted holders,
    g1—a wanted holder, emptied in the process, is supplied to a storage section in the main storage device, and
    g2—a then still partially loaded wanted holder is passed back to a storage section in the auxiliary device
    d3—in case in the main storage sections n4 holders together contain more than the number of s2 wanted articles, but no combination of exactly s2 can be made with them, either carrying out the steps a,b and c1 for n4-1 holders of the main storage sections and carrying out the steps a,b and c2 for a holder of the main storage sections or, if in the auxiliary storage sections one or more holders n5 together contain the number of articles that cannot be provided by n4-1 holders of the main storage sections, carrying out the steps a,b and c1 for n4-1 holders of the main storage sections and carrying out the steps e, f, g1, g2, accordingly, for said n5 holders of the auxiliary storage sections;

d4—in case one or more of the holders n6 in the auxiliary storage sections together contain s2 wanted articles, carrying out the steps e, f, g1, g2, accordingly for those n6 holders of the auxiliary storage sections.

In one embodiment, the articles of one type are stored in identical numbers in one or more series of holders in the main storage sections. Thus a type of article may be stored in one series of holders, for instance, by 10 articles per holder, for instance. It is also possible to make use of several types of holders, with different capacity, by way of example with 1/1 and ½ capacity. In the one series 10 articles can be accommodated in each holder and in the other series 5 articles can be accommodated in each holder, for instance.

Preferably, in the main storage sections, the articles are stored in storage sections assigned to said articles. Preferably, in the auxiliary storage sections at random.

It is remarked that the first movement means mentioned above preferably are configured for simultaneously moving the platforms at both opposite frame sides. In this connection, in the methods according to the invention the platforms situated at both opposite frame sides are preferably moved simultaneous.

It is remarked that the holders can be configured for directly carrying articles, or be configured for carrying trays or the like that can be released from the holders and in which articles have bee accommodated.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of a number of exemplary embodiments shown in the attached drawings, in which:

FIG. 1A shows an isometric view of a first exemplary embodiment of a device according to the invention;

FIG. 1B shows an isometric view of the device of FIG. 1A, in which the storage sections have been left out;

FIGS. 2A and 2B show a schematic top view and a side view of a rotary disk of the device according to FIGS. 1A and 1B and FIGS. 2C and 2D schematically loading/unloading holders on the rotary disk;

FIGS. 3A-E show a number of schematically depicted stages in using the device according to FIGS. 1A and 1B, however, with singular platforms;

FIGS. 4A-F show a number of schematically depicted stages in using an alternative exemplary embodiment of a device according to the invention, in schematic top view and schematic cross-section, respectively, at the location of a transfer device;

FIG. 5A shows a schematic top view of another exemplary embodiment of a combined device according to the invention;

FIGS. 5B-D show a number of stages in using the device according to FIG. 5A;

FIG. 6 shows an alternative exemplary embodiment of a device according to the invention, in isometric view, with a tandem set-up of platforms;

FIGS. 6A-C show a schematic top view of the transfer storey in the device of FIG. 6 and two alternatives for it, respectively;

FIGS. 7A-E show a number of stages in using a further exemplary embodiment of the device according to FIG. 6, with a transfer storey according to FIG. 6A;

FIGS. 8A and 8B show alternative schematic horizontal cross-sections of a part of a frame of the device according to FIG. 6;

FIGS. 9A-D show a number of stages in using a further exemplary embodiment of a device according to the invention, with tandem platforms, having platforms positioned one above the other; and FIGS. 10A and 10B show two stages in using another exemplary embodiment of a device according to the invention, with tandem platforms.

DETAILED DESCRIPTION OF THE DRAWINGS

Figure 7A:
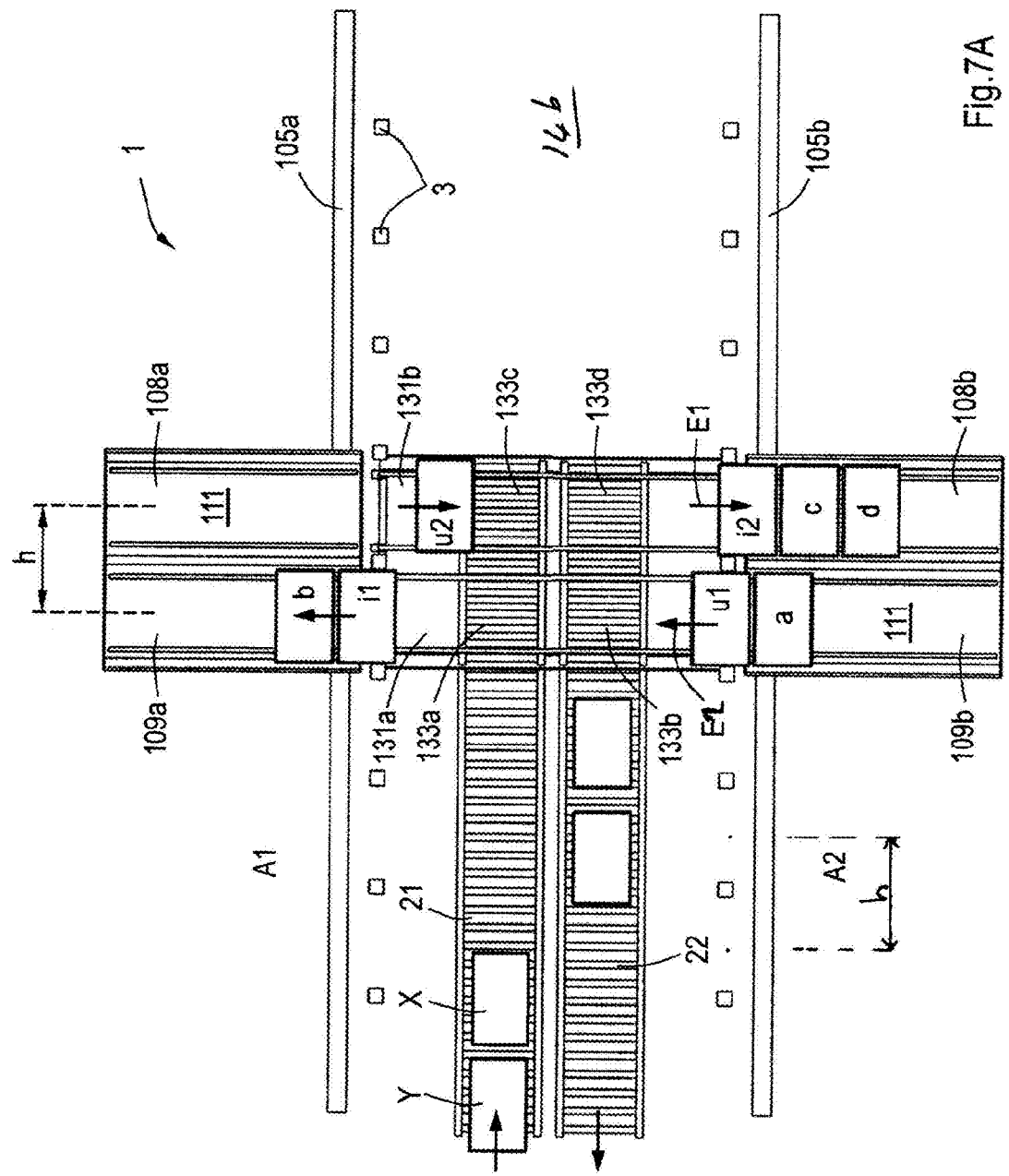

The device 1 in FIG. 1A comprises a frame 2 with posts 3, within which a series of storage sections 4 are borne, according to a set-up vertically above one another in columns and horizontally next to each other in rows. In that way, storeys 14a of storage sections 4 have been formed. In the storage sections tray-shaped holders 10 (in this example six each time) are supported on support profiles that are not shown, such that they can be shifted over them, which support profiles extend between frame sides A. The frame 2 has first and second frame sides A and third and fourth frame sides B that are transverse to the frame sides A. In this example the sides A are longer than the frame sides B.

Primary auxiliary frames 5a,b are present at the first and second frame sides A, which primary auxiliary frames can be simultaneously moved up and down (directions C) along the frame 2 to the wanted storey by means of primary servo-drives that are not shown. Secondary auxiliary frames 5a,b have been arranged within the primary auxiliary frames 5a,b, which secondary auxiliary frames can be reciprocally moved (directions D) along the primary auxiliary frames 5a,b by means of secondary servo-drives that are not shown.

The secondary auxiliary frames 6a,b carry platform units or transfer units 7a,b that each contain two mutually identical platforms or transfer members 8a,9a and 8b,9b. The platform units 7a,b can be moved such along the frame sides A by the first movement means, that the operational range of the platforms 8a and 8b coincides and likewise for the platforms 9a and 9b. In this case they are situated above one another at a fixed distance, but a set-up next to each other is also possible, also see FIG. 6. The platforms 8a,b and 9a,b each have a capacity of half a storage section, in this example that means three holders 10. The platforms 8a,b and 9a,b each have conveyor belts 11 driven in directions E by related servo-drives, on which conveyor belts a stop 12 has been arranged which therefore moves along with the belts 11. Instead of conveyor belts 11, for instance driven rope belts can be used, wherein the holders find support on the rope belts and are moved by them. Other means known to the expert are also possible, such as an embodiment in which the holders are supported on the platform at a relatively stationary support, such as a plate or profiles, and can then be moved by a slide or a different type of pusher or flight.

The primary drives and the secondary drives are part of first movement means. The drives of the belts 11 on the platform units are part of the second movement means. The drives of the second movement means, such as servomotors (for the belts 11 or the like) can be controlled individually, and namely in the same direction, in opposite direction away from each other or in opposite direction towards each other, depending on the wanted displacement. The displacement towards each other may be wanted in order to form a closed series of holders between the stops at the platforms, also see WO 2012/018255. The displacement away from each other may be wanted in order to remove a holder from the transition between platform and storage section. The first and the second movement means are controlled by a central control unit or central control system 100.

The drives for the second movement means can also be controlled selectively per platform storey.

Between the lowermost storey 14a and the storey 14a situated above it an intermediate storey 14b has been provided, comprising a transfer device 30. In this example the transfer device comprises a rotary disc, also see FIG. 1B and FIGS. 2A-D. The intermediate storey 14b further comprises an exit conveyor 26, extending transverse to the storage sections 4 for conveying holders in the direction J and at a frame side B extending to outside of the frame 2 and connecting to a further conveyor 20, which in U-shaped manner runs along the side A to the other frame side B, via sections 22, 23 and 21, according to directions I, Q and H. The conveyor 26 is part of exit track 22 and the conveyor section 21 forms an entry track 21 here. It is also possible that the entry track 21 extends to inside of the frame 2, if the transfer device 30 is situated further inward in the frame. The conveyor section 23 extends along an entry/exit station 40, that may comprise an entry/exit device and/or where one or more persons are able to carry out entry/exit operations. At this location, holders present on the belt 23 can be filled with articles to be stored and wanted articles can be taken out of holders present on the belt. Alternatively, wanted holders 10 can be removed from the belt 23 and newly filled holders 10 can be placed on the belt 23 for entry in the storage sections 4. Entry and output of articles and/or holders is registered in the central, programmable control unit 100.

A pusher 24 (also see FIG. 2D) has been provided for transferring a holder from conveyor section 21 to transfer device 30, a pusher 25 has been provided for transferring a holder from the belt 26 to the conveyor section 22.

The transfer device 30 can be configured in various ways. An example is the rotary disk 31 depicted in FIGS. 2A-D and used in FIGS. 3A-E. By means of a drive that is not shown, the rotary disk 31 can be rotated about a vertical centre line, in directions N1, N2. A slide assembly 33 is supported on the rotary disk 31, which assembly 33 can be reciprocally shifted and comprises two slides 34a,b, that form one unity with a coupling-bar 34c. The slides 34a,b can be shifted over support surfaces 32a,b, each adjusted to supporting a holder 10. The slide assembly 33 is passive, as a result of which the rotary disk 31 can be simple. External drives, to be discussed on the basis of FIGS. 3A-E, are used for shifting the slide assembly.

In FIGS. 3A-E, a process is shown in which, instead of the said platform unit, each time one platform 8a,b is present at both first and second frame sides, sides A. This regards a description of the use of the transfer device. The use of platform units will come up when discussing FIGS. 6 and 7.

FIG. 3A shows a moment in time, in which the platforms are situated at a storey 14a near a storage section 4. At that location, by operating the belt 11 with stop 12 of platform 8a in direction E2, by pushing, by means of stop 12 of platform 8a, the series of holders formed by holders 10c, 10d, the holders that are present in storage section 4 and holder 10c, the leading holder 10c has been shifted from the storage section 4 onto the belt 11 of platform 8b, wherein both belts 11 are driven synchronously in direction E2. The holder 10c abuts stop 12. At the storey 14b a full holder 10b is pushed in the direction K onto support surface 32a by pusher 24. The slide 34a, see FIGS. 2C,D, is then urged in the direction L, as a result of which the support surface 32a is gradually cleared and due to the coupling via bar 34c the opposite slide 34b pushes the holder 10a already present there from support surface 32b onto the belt 26, which discharges the holder 10a in the direction J.

The rotary disk 31 is subsequently rotated 90 degrees (N1) into the position depicted in FIG. 3B. The platforms 8a,b have been taken to the storey 14b in directions C1 and D1, aligned with the slide assembly 33. Then both belts 11 are operated in the direction E1, wherein the stop 12 at platform 8b pushes the holder 10c against the slide 34b and as a result the slide assembly 33 to the right, as seen in the drawing, in direction P. As a result, the slide 34a pushes the holder 10b onto the belt 11 of platform 8a, which belt 11 moves synchronously with the belt 11 of platform 8b. The support surface 32a will then be empty again.

Both platforms are then taken to a wanted storey 14a and a storage section 4, directions C2 and D2, see FIG. 3C. At that location the holder 10b is discharged from platform 8a to the storage section 4, while simultaneously, in one shifting motion of all holders 10 situated between both stops 12, discharging the leading holder 10g to platform 8b.

Simultaneously the rotary disk 31 has been rotated 90 degrees retrograde in direction N2 so that a next holder 10f to be taken into storage can be received on the rotary disk 31, while simultaneously discharging holder 10c to belt 26, see FIG. 3D. The platforms 8a,b are returned again, directions C1 and D1, to the position of FIG. 3E. Subsequently holder 10g is pushed onto support surface 32b and holder 10f is pushed from support surface 32a onto belt 11 of platform 8a. The cycle described above is then repeated, to a wanted storage section 4.

In FIG. 3D it can be seen that upon the holder's 10a arrival at the end of belt 26, pusher 25 pushes it in the direction M onto the belt 22.

In this example the holders 10 to be retrieved from storage are retrieved using platform 8b. It is also possible to do so at the other side A only, or at both sides A. The rotary disk 31 can also be rotated onwards several times in the same rotary direction.

In this example each time one holder 10 is retrieved and stored. It is also possible to do so with several holders simultaneously, in which case the support surfaces 32a,b will be accordingly larger.

The transfer device 30 is controlled by the central control unit 100.

In FIGS. 4A-E another embodiment of the transfer device is shown. Instead of a rotary disk there are now two conveyors that are transverse to each other, namely, see FIG. 4B, a rope belt conveyor 131 circulating about end rollers 132a,b, one of which is driven, and extending between both sides A, and a roller track 133 with driven rollers, which track is oriented transverse thereto. The roller track 133, that can be moved upwards/downwards between the rope belts, is supported in supports 134, which are connected to a pneumatic cylinder 136 via connection 135, as a result of which the roller track 133 can be moved in directions Z between a passive position below the rope belts 131 and an active position above the rope belts 131, in one plane with conveyors 21 and 26. For the sake of simplicity, the corners of the conveyors 21, 22, 23 and 26 have been depicted here as bends. Instead of a roller track that can be moved up and down, the alternative option is enabling the rope belt conveyors to be lifted up and down, also see the discussion of FIG. 6.

In FIG. 4A in storey 14b at the lifted roller track 133, a holder 10a to be outputted is discharged to the belt 26 by the driven rollers, while receiving a next holder 10b intended for storage, from the driven belt 21. A pusher will not be required for the displacement of holder 10b. The platforms 8a,b are in the process of retrieving a holder 10c from a storage section 4 in a storey 14a. The platforms 8a,b are subsequently taken to a position that is aligned with the rope belt conveyor 131, see FIG. 4C. The roller track 133 has been lowered so that the holder 10b rests on the rope belts. Subsequently, see FIG. 4D, the belts 11 of the platforms 8a,b and the rope belt conveyor are driven, synchronously, as a result of which the holder 10c arrives on the rope belts and is taken to a position above the roller track 133, likewise the holder 10b is taken to the platform 8b and its belt 11. It is also possible to drive the rope belt conveyor 131 with holder 10b supported thereon before that, separately from the belts 11 of the platforms 8a,b, so that the holder 10b is already positioned in front of the receiving location of platform 8b when the platforms are being aligned with the rope belt conveyor 131.

The platforms 8a,b are then taken to a wanted storage section, in order to discharge holder 10b thereto. The roller track 133 is lifted again and, see FIG. 4E, the holder 10c is discharged to belt 26 while receiving a next holder 10f to be taken into storage onto the roller track 133.

In this example each time one holder 10 is retrieved and stored. It is also possible to treat several holders simultaneously, in which case there will be several parallel roller tracks and several entry and discharge belts.

In FIG. 4F an example is shown of an alternative approach with a shorter stroke in direction P, including roller tracks on each side A (in the drawing the platforms will be situated directly to the left and the right thereof, yet they have not been depicted), wherein a slide assembly 137 comparable to slide assembly 33 is present, having slides 138a,b coupled to each other by bar 138c. The roller tracks 133a and 133b can either be reserved for entry and exit, respectively, meaning that the one connects to an entry track and the other connects to an exit track, or each both connect to an entry track and an exit track. The transfer device is then divided in two, cooperating transfer stations, one on each frame side.

By means of the central control unit 100 all functions in the device are controlled, including the drives for the primary and secondary auxiliary frames and the drives for the belts 11 and the drives for the pushers 24, 25 and the transfer device 30 (with the rotary disk or with the rope belts/roller track combination). In the central control unit 100, the position of the holders 10 as well as their content and therefore the articles are always known.

In the embodiments shown in FIGS. 3 and 4 the connections of the transfer device to the connections to the entry track and exit track are aligned, according to a line transverse to the line connecting the platforms to each other.

In the FIGS. 5A-D a combined set-up of a main storage device 1 and an auxiliary storage device or buffer device 101 is shown.

The main device 1 comprises a frame 2 with posts and is comprised of with storage sections for holders and with platforms 8a,b that can be moved up and down and reciprocally along sides A, all in accordance with the aforementioned International patent applications. In this case the platforms can optionally also be configured as multiple platform units, as discussed above. The storage sections will generally be reserved for/assigned to specific articles and furthermore the holders filled with articles will be situated in the storage sections at the A2 side, empty holders at the A1 side. In accordance with an invention described in WO 2010/09512 the control unit can be programmed such that platform 8a is reserved for empty holders and platform 8b to loaded holders. In this example, the loaded holders have been fully filled with articles that are mutually identical per holder.

The output of empty holders and the entry of once again filled holders takes place at frame side B2 in a manner that is not further shown.

For the output from the frame 2 and the entry therein of loaded and empty holders, respectively, transfer members 60a,b have been provided at the frame side B1 near the corners, which transfer members form first and second transfer stations, therefore together a transfer device, with which the platforms 8a,b can be aligned for transferring a holder. For that purpose, said transfer members 60a,b may have a driven support surface.

The transfer members 60a,b connect to separately driven entry-exit belts 21, 22, that are connected to each other by belt 23. Just like in the example of FIG. 1A, the belts 21, 22 and 23 form a U. The belts 21, 22 and 23 together form a main track 20 that may or may not be composite. A pusher 61a has been provided for transferring a holder from the entry track 21 to the transfer member 60a.

The auxiliary device 101 is positioned in the space between the main track 20 and the side B1 of frame 2. In this case it is configured with a frame 102 having one column of storage sections, which storage sections each form a storey 114a, as discussed above on the basis of FIG. 1A.

However, one intermediate storey 114b has been configured in accordance with the transfer device of FIGS. 4A-E, meaning with a rope belt conveyor 131 and a roller track 133 that can be lifted. At the first and second frame sides, platforms 108a,b (again with driven belts 111) can be moved up and down between the various storeys 114a and 114b. In this auxiliary device 101, holders are stored at random yet in a known manner, which holders are only partially filled with articles that are mutually identical per holder (the type of article may differ per holder).

An auxiliary track 120 has been provided for the entry of holders and the output of holders, which auxiliary track is at least almost closed in the shape of a near-O, closed by the roller track 133. An entry path 121, and exit path 122 and an intermediate path 123 can be distinguished.

The intermediate path 123 runs parallel and adjacent to belt 23 of the main track 20. In said coinciding path a removal station with an article remover 80 has been provided, in the form of a robot controlled by the control unit 100, which robot has a grab for taking one or more articles out of the holder. Downstream of the robot 80 transfer members 71 and 72 have been provided, for transferring a holder from the path 123 to the path 23 and for transferring a holder from the path 23 to the path 123, respectively.

For correctly positioning the holders where wanted, pneumatically operable stoppers 62 have been provided. Furthermore, bar code readers 63, for holders on the auxiliary track and on the main track, have been provided upstream of the removal station 80.

The central, programmable control unit 100 controls all functions in the device, as already stated above, in this case also the input of the bar code readers 63 and the stoppers 62. The control of the platforms 8a,b of the main device will take place in concord with the entry/output of holders at the frame side B2.

In the central control unit 100 the position of the holders 10 in both the storage sections 4 of the main device and in the storage sections 14 of the auxiliary device is always known. Furthermore, the exact content of the holders is known in the control unit.

The auxiliary device 101 is used for buffering holders coming from the main device 1 and from which, in the removal station 80, one or more articles have been taken, however, while leaving one or more articles behind in said holders. The merely partially filled holder, at least holders that are filled less than they initially were in the main device, are stored in the buffer device 101, at a random location, until a later request.

When a certain number of an article is requested, by entering the query in the control unit, the control unit will verify where the article has been stored and how they have been distributed over the holders, in the main device and in the auxiliary device. A balance in holders taken from the buffer device and holders to be entered into it again, will be also be striven for.

If the control unit has been programmed to use as many fully filled holders as possible, for instance because of the fact that they have already been grouped, then said holders are retrieved from the storage sections in question of the main device. In case the number of articles to be retrieved that way exceeds the wanted number, there are two possibilities which will be elucidated plainly below.

The first possibility is that all holders 10a,b,c supplied on the main track, see FIG. 5B, are emptied all but one by robot 80, and that the last holder 10c is only partially emptied. The holders 10a,b are empty and run onwards over path 23 and path 21 back to transfer member 60a and platform 8a. The holder 10c is shifted to the path 123 by transfer member 72 and then on path 121 taken to the transfer device 130 in order to be transferred to platform 108a,b.

The second possibility is that only the holders 10a and 10b are retrieved and that a partially filled holder 10c is retrieved from the buffer storage, see FIG. 5C. The holder 10c is emptied entirely by robot 80 and subsequently transferred from path 123 to path 23 by transfer member 71, and then supplied to the main storage together with the other empty holders 10a,b.

If the order can be put together using filled holders from the main storage only, they are emptied by robot 80 and said empty holders 10a,b,c subsequently run back over path 21 to the main storage, see FIG. 5D.

If, over the course of time, an undesirable large number of partially filled holders of an article have been stored in the buffer storage, the control device may also have been programmed to first verify whether an order can be put together using as many of said partially filled holders as possible.

In FIG. 6 an alternative to the device of FIG. 1A is shown, wherein within the primary auxiliary frames 105a,b that can be moved up and down in directions C, the secondary auxiliary frames 106a,b can be reciprocally moved horizontally (directions D), simultaneously, and each carrying platform units or transfer units 107a,b, each comprising two mutually identical platforms or transfer members 108a,109a and 108b,109b. However, they are now situated next to each other, at a (fixed) centre-to-centre distance h equalling that of the storage sections 4. The columns at the frame side A have identical widths but differ from one another, namely alternately column 3a, column 3b and column 3c, in accordance with FIG. 8A, see below. Because of the first movement means the platform units 107a,b can be moved such along the frame sides A that the operational range of the platforms 108a and 108b coincides and likewise for the platforms 109a and 109b.

The platforms 108a,b and 109a,b again each have a capacity of half a storage section 14a, in this example that means three holders 10. The platforms 108a,b and 109a,b each have conveyor belts 111 driven in directions E by related servo-drives. The conveyor belts of platforms 108a,b that can be aligned with each other, can be driven synchronously in selectively E1 or E2, and the same goes for conveyor belts 111 of platforms 109a,b. The drive direction of the belts 111 of platforms 108a,b can be identical or opposite to the drive direction of the belts 111 of platforms 109a,b, depending on what is wanted in the storage/retrieval process.

With end portions 105c,d, the primary auxiliary frames 105a,b extend along first and second frame sides A1, A2 to outside of the frame 2, and to such an extent that platforms 108a,b can be functionally aligned with the outermost storage sections 4 at the third frame side B1 and that platforms 109a,b can be functionally aligned with the outermost storage sections 4 at the fourth frame side B2, also see the discussion of FIGS. 7A-E.

Two sets of entry tracks/exit tracks 21a,22a and 21b,22b are housed in the transfer storey 14b (also see FIG. 6B), so that entry and output is possible at both third and fourth frame sides B1, B2. The entry tracks and exit tracks connect to two rope belt conveyors 131a,131b that are also situated at a centre-to-centre distance h from each other. In this example the rope belt conveyors 131a,b are supported in supports/trolleys 139a,b (FIG. 6), which can be lifted up and down, to receive a holder 10 from the roller track 133a,b or 133c,d or to put it down on them, an alternative to the set-up shown in FIGS. 4A-F.

The transfer storey 14b can be configured in different ways. A number of examples can be seen in FIGS. 6A-C. The platforms have been left out here, but it will be understood that they can be aligned with the transfer device 130, in particular its conveyors 131a,b. Roller tracks 133a,b and 133c,d are situated within the rope belt conveyors 131a,b, wherein the rope belt conveyors and those roller tracks can be moved relatively up and down for transferring a holder, as discussed above. In FIG. 6A the entry track/exit track 21, 22 is substantially parallel and one-sided, and it can be U-shaped. A standby location 80 has been provided next to the exit track 22, said location having a transfer member 81 comprising two pulling members 81a,b which with a mutual connection 82 form one unity and which can be reciprocally moved in directions Q by a drive that is not shown, in order to temporarily transfer a holder situated on the exit track 22 to the standby location 80, so as to allow a trailing holder to pass, and then place the former back again on the exit track 22. This facility can also be used with other exit tracks, such as the one in FIGS. 6B and 6C. In FIG. 6B two sets of entry tracks/exit tracks 21a,22a and 21b,22b are shown. In FIG. 6C a single set of entry tracks/exit tracks 21,22 is shown.

It is noted that the control unit is able to control the rope belt conveyors synchronously with the platform belts, but is also able to do this individually. It is possible to bring a holder to be stored in a position directly in front of the yet to arrive platform, by means of the rope belt conveyors, at the first opportunity, already before the platforms have been aligned with the rope belt conveyors. In that way, after taking over the requested holder to be outputted from the platform at the other side (wherein the holder to be stored, has been received by the first platform), more freedom in positioning the holder to be outputted will be available, which is of importance in case several, parallel exit tracks are present.

An example of using the tandem set-up with adjacently positioned platforms is elaborated in FIGS. 7A-E. The (only partially shown) device 1 corresponds with the one in FIG. 6, however, including the entry/exit tracks of FIG. 6A. In FIG. 7A the transfer storey 14$b$ is shown, at the moment a holder i1 to be taken into storage is transferred to platform 109$a$ and a holder i2 to be taken into storage is transferred to platform 108$b$. Simultaneously or subsequently a requested holder u2 is discharged by belt 111 from platform 108$a$ to rope belt conveyor 131$b$ and a requested holder u1 discharged by belt 111 from platform 109$b$ to rope belt conveyor 131$a$, which rope belt conveyors are driven such that the holders u1 and u2 end up on the exit track 22. The holder x and y on entry track 21 will be stored in a next stroke.

In FIG. 7B the primary auxiliary frames 105$a,b$ have been lifted, direction C1, to a storey 14$a'$ with storage sections 4, where a first holder 10$a$ to be retrieved, is situated. A second holder 10$b$ to be retrieved can also be situated at said storey, but in this example it is indicated between brackets that it is situated at a different storey (14$a''$, figure D). In FIG. 7C it can be seen that the holder 10$a$ is received together with holder e on platform 109$b$, and simultaneously the holders b and i1 are transferred from platform 108$a$ to the same storage section 4$a$. Simultaneously the holders i2, c and d are transferred from platform 108$b$ to storage section 4$b$, situated adjacent to storage section 4$a$, and holders f, g, h are transferred from said same storage section to platform 108$a$. In that way preliminary work is done for receiving the second holder 10$b$ to be retrieved, in a later stroke.

Both platform units 107$a,b$ are then moved, direction D1, along the primary auxiliary frames 105$a,b$, and with said auxiliary frames moved vertically, direction C2, in order to bring the platforms in storey 14$a''$, with the platforms 108$a,b$ aligned with storage section 4$c$, containing holder 10$b$ and situated at the frame side B1 (FIG. 7D). This is possible because the auxiliary frames 105$a,b$ project with end portions 105$c,d$ to provide room to platforms 109$a,b$. As during the preliminary work it was taken care of that platform 108$b$ is empty, holder 10$b$ can be transferred in one stroke, see FIG. 7D, together with holders k and l. Because the capacity of a platform is half the capacity of a storage section, a holder in a storage section can be transferred in one stroke to an empty platform situated at the side closest to that holder.

The other holders in storage can be used for moving the requested holders and holders to be stored, in the wanted manner. The platforms can therefore actually be considered a part of the overall storage space: in FIG. 7A the holders a-d are in storage.

The platform units 107$a,b$ are then taken to storey 14$b$ again, see FIG. 7E, where the holders 10$a$ and 10$b$ are taken over from platforms 109$b$ and 108$b$ by rope belt conveyors 131$a$, 131$b$, and simultaneously holders x and y are transferred to platforms 108$a$,109$a$. Shortly before that, by lifting the rope belt conveyors, the holders x and y have been taken over from the roller tracks 133$a$,133$c$ and have already been taken to the ends of the rope belt conveyors 131$a,b$ by the rope belt conveyors. When the holders 10$a$ and 10$b$ have arrived over the roller tracks 133$b$ and 133$d$, the rope belt conveyors 131$a$,131$b$ are lowered again in order to transfer the holders 10$a$,10$b$ to the roller tracks 133$b$,133$d$. The holders 10$a$,10$b$ are subsequently transferred to the exit track 22.

If holder 10$b$ is wanted to be leading holder, use can be made of the standby facility, as discussed in FIG. 6A.

As discussed in the introduction to the description, in case the control unit 100 constantly traces/monitors the position of the holders and it is also known which articles are situated where, and in which numbers, the holders present in the device can be used as displacer in the process of getting a wanted holder to be retrieved, on a platform. All holders in the device can be provided with one or more articles. The articles may differ from one holder to the next.

In FIG. 8A a first example is depicted of a column division at the frame side where the platforms are operational, wherein the columns 3 of the frame 2 have been functionally split up, namely in a general supporting function, column parts 90, a guiding function for guide rollers 92$a$,92$c$, namely column parts 91$a$,91$c$, and a guiding function for lift belt 94$b$, namely column parts 91$b$. The column parts 90 ensure an evenly distributed absorption of vertical loads as much as possible. The column parts 91$a,c$ are oriented oppositely, for horizontal balance of forces arising when guide rollers 92$a,c$ roll through column parts 91$a,c$, which guide rollers have been attached to primary auxiliary frames 105$a$ by brackets 93$a,c$, as discussed above. The belt 94$b$ accommodated in column part 91$b$ forms a loop forming one unity with belt 94$a$, which via attachment member 93$b$ has been attached to auxiliary frame 105$a$. At the top and at the bottom in the frame 2, the loop runs about pulleys 95, one of which is driven.

According to another aspect, a separation of function has been realized in a direction parallel to the storage sections. In that way supporting column part 90 is always offset in that direction relative to the guiding column part, for the rollers column parts 91$a,c$ and for belt portion 94$b$, column part 91$b$. Due to the separation of functions, the width taken up by the columns can be kept limited, and the centre-to-centre distance of the storage sections can be the same all along the entire storey without objections.

This is further developed in the embodiment of FIG. 8B, in which the roller guiding functions and the supporting function have been realized in one column assembly, divided in a direction parallel to the storage sections. Here, see columns 3$d$, the belt portion 94$b$ has been accommodated in column part 90. A belt passage has been provided at the upper end and the lower end of column part 90, without compromising the stability of the frame. The belt portion 94$a$ runs within an outrigger 93 (and has been attached to it) on auxiliary frame 105$a$, to which two guide rollers 92$a,b$ have been attached, which are guided in column part 91 which forms one unity with supporting column part 90 and is situated at the side thereof, which faces auxiliary frame 105$a$. Due to the combination of the belt accommodation/guidance and the roller guidance, a column part (column 3$e$) can be dispensed with, namely the column part 91$b$ of FIG. 8A. At that location a column part 90, see FIG. 8B, will suffice.

In FIGS. 9A-D another example of a device 1 according to the invention is shown, with a set-up of several columns of storage sections 4 situated next to each other, in storeys 14a, and with tandem platforms having platforms situated one above the other. In between the lowermost storey 14a and the storey 14a situated above it a storey 14b has been accommodated, where a transfer device is situated, in this case in the form of a rope belt conveyor 131 extending parallel to the storage sections 4 and a roller conveyor 133 operating transverse thereto, in accordance with the set-up of FIGS. 4A-E.

Platform units 7a,7b have been provided at both first and second frame sides, which platform units can be moved up and down simultaneously and each have two platforms 8a,9a and 8b,9b situated one above the other, as is the case in FIG. 1A. The platform units 7a,7b can also be moved in directions perpendicular to the plane of the drawing, in accordance with the set-up of FIG. 1A. The auxiliary frames 5a,b and 6a,b, however, have not been shown here.

The mutual vertical distance between the storeys 14a that are situated above storey 14b is t, and the vertical distance between storey 14b and the storey situated above it is also t. The vertical distance between storey 14b and the storey 14a situated below it is n×t, in this case 2t. Said size corresponds with that of the fixed mutual vertical distance between platforms 8a-9a and between platforms 8b-9b.

In this example the device 1 is being used for random storage of holders with articles, of which tally is kept in the control unit 100 (not shown). In FIG. 9A, a wanted holder 10a, that has to be retrieved, has been indicated. The holder 10a is situated closest to the right-hand frame side. At the transfer storey 14b a previously retrieved, wanted holder 10y is situated, newly arrived from platform 8b and being moved over the rope belts 131 towards roller track 133, while at the opposite end a holder 10i to be received has been shifted onwards onto platform 8a, while shifting holders 10j and 10k already present on it, onwards. Simultaneously, at storey 14a below it, three holders 10l,10m,10n have been shifted onwards from said storey onto platform 9b. After that the situation is such that platform 8a carries three holders, platform 9a none, platform 8b none, and platform 9b three holders.

The platform units are then moved to the position of FIG. 9B, in which the platforms 8a,b are aligned with a storage section 4 and the platforms 9a,b are aligned with a storage section 4 situated two storeys below it, in which storage section the wanted holder 10a is situated. The drives of the belts 11 or rope belts 11 of the platforms 8a,b and 9a,b are activated, such that the three holders 10l, 10m, 10n are shifted from platform 9b in direction E1 onto storage section 4 while shifting the series of holders at said storage section onwards and shifting the three leading holders 10b,10c,10d onto platform 9a. More or less simultaneously, in opposite direction E2, the holders 10i,10j,10k are shifted from platform 8a onto storage section 4, while shifting the series of holders at said storage section onwards and shifting the three leading holders 10f,10g,10h onto platform 8b. The situation will then be such that platform 8a carries no holders, platform 9a three holders, platform 8b three holders, and platform 9b no holders. Holder 10a is only one holder 10e away from the right-hand frame side.

Meanwhile the roller track 133 has been lifted and the holder 10y has been transferred to an exit conveyor, as discussed above, and a holder 10z to be received has been shifted onto the roller track 133, direction K.

The platform units 7a,b are subsequently moved downwards over a distance n×t, in this case 2t, to the position of FIG. 9C. The drives of the belts 11 or rope belts 11 of the platforms 8a,b are activated, such that the two holders 10g and 10h are shifted in direction E1 from platform 8b onto storage section 4 while shifting the series of holders at said storage section onwards and shifting the leading holder 10e and the wanted holder 10a onto platform 8a. The platforms 9a,b are not operated now. The situation will then be such that platform 8a carries two holders, including holder 10a, platform 9a three holders, platform 8b one holder, and platform 9b no holders.

Now that the holder 10a has been loaded onto a platform, the platform units 7a,b are moved downwards again to the position of FIG. 9A. At that location the belts 11 are activated again to bring holder 10a from platform 8a onto the rope belts 131, with which the holder 10a is moved to above the lowered roller track 133 while moving the holder 10z to be stored to platform 8b. The roller track is lifted and activated for discharging holder 10a, while receiving a next holder to be stored.

As the next wanted holder 10p to be retrieved is situated closer to the left-hand frame side, at a third position from said frame side, the holders 10b,10c,10d already present at platform 9a can be used in a next retrieval stroke with the platform units 7a,b. For that purpose, platform 9a will be aligned with the storage section of holder 10p, after which the three holders 10b,10c,10d are shifted onto said storage section, while shifting the series of holders at said storage section onwards and shifting the two leading holders 10q and 10r and the wanted holder 10p onto platform 9b. Simultaneously holder 10z to be received is shifted onto the storage section situated at a distance n×t above it. Holder 10p is then moved to the transfer device at storey 14b by means of platform 9b. The holder to be received, present over the roller track, is subsequently moved to platform 9a.

In that way a wanted holder situated at a random position can be retrieved in either a limited number of stokes or in strokes of a limited length.

Note that the position of a holder loaded with articles is irrelevant, as its position is known in the control unit, and no storage sections have been assigned to articles. At the moment of entering the retrieval request for a holder, said holder may be positioned at a platform and then be discharged therefrom to the transfer device. If the wanted holder at the platform is not located in a position directly adjacent to the storage sections, a circulation step can be carried out first, in order to actually realize said position.

Other locations of transfer storey 14b are possible. The set-up may for instance be inverted, wherein storey 14b is the top storey but one. Storey 14b can furthermore be accommodated more to the middle of a column of storage sections, wherein, in the example of FIGS. 9A-D, a series of storeys 14a, at mutual vertical distances oft, are present below the lowermost storey 14a, so also below storey 14b. In that case alternatively the vertical distance between storey 14b and the storey 14a situated above it may equal n×t, that means in this case 2t, and the vertical distance between storey 14b and the storey 14a directly below it may equal t.

The exemplary embodiment of a device 1 according to the invention depicted in FIGS. 10A and 10B, largely corresponds with the one in FIGS. 9A-D, however, here the lowermost storey 14a is situated at a vertical distance of t1 below the storey 14b with transfer device, and storey 14b is situated at the same distance t1 below the storey 14a situated directly above it. The storeys 14a situated above it have a mutual vertical distance of t, wherein t<t1<2t. In this example, a transfer device 30 has been accommodated in the storey 14b in accordance with the set-up with rotary disk 31 as discussed above. Due to the identical vertical distance from the transfer storey to the storey 14a situated directly above it and directly below it, it is possible, in view of retrieving a wanted holder in another storey 14a, to prepare and optimize the position of holders at the platforms in a short space of time using short vertical movements of the platform units. Circulating near the storage section 14a of the wanted holder will be required fewer times, so that the condition of the distance t1 not being equal to any n×t and as a consequence the use of for instance the platforms 9a, b following the use of the platforms 8a,b requiring a short vertical displacement, is not objectionable. Note that the capacity of each of the platforms in FIGS. 10A,B is half the capacity of a storage section.

The first, second and third movement means can be configured in any suitable way that is available to the expert. The first movement means may form a first movement system or movement device. They may comprise lifts, such as said auxiliary frame that can be moved up and down, driven by cables, belts, chains and the like, or by cylinders, gear rack mechanisms and the like. For movement in horizontal sense, trolleys or carriages driven in any suitable way, can be used. The lift and trolley can be combined. The lift can also be arranged on a column-like structure that is horizontally movable, for instance supported on a trolley movable over the floor or suspended from a trolley of an overhead structure.

The second and third movement means may form second and third movement devices, which may optionally coincide in part. They may comprise conveyor belts or driven rope belts, belts et cetera, optionally provided with a pusher or slide that can be moved by it and able to engage a holder. Instead of a movable support surface for the holders, use can be made of a stationary support surface, in combination with reciprocally movable pushers, pulling members et cetera, engaging the holders.

The invention(s) is/are not at all limited to the embodiments shown in the drawings and described in the description. The above description has been included to illustrate the operation of preferred embodiments of the invention and not to limit the scope of the invention. Starting from the above explanation many variations that fall within the spirit and scope of the present invention will be evident to an expert. Variations of the parts shown in the drawings and described in the description, are possible. They may be used individually in other embodiments of the invention(s). Parts of various examples given can be combined with each other.

The invention claimed is:

1. A device for keeping articles in temporary storage, comprising:
   a frame having at least one series of mutually parallel, elongated storage sections, placed in a column set-up and extending between a first frame side and a second frame side of the frame,
      wherein the frame forms a series of storeys in which the series of storage sections are accommodated,
      wherein the storage sections are provided with holder supports on which series of holders for the articles are supported;
   at the first frame side and the second frame side, at least one first and at least one second platform are respectively arranged, each platform being configured for receiving at least one holder;
   a first mover for moving the platforms from a position in which both are aligned with one of the storage sections to a position in which both are aligned with another one of the storage sections; and
   second movers for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction,
   wherein at least two first platforms and at least two second platforms, respectively, are disposed at both frame sides,
   wherein the at least two first platforms are part of a first platform unit movable as one unity and wherein the at least two second platforms are part of a second platform unit movable as one unity,
   wherein, within the platform units, the platforms are situated next to each other,
   wherein the first and the second platform units are movable by the first mover from a position in which a pair of first and second platforms are aligned with one of the storage sections and another pair of first and second platforms is aligned with another one of the storage sections, to a position in which the one pair of first and second platforms is aligned with another one of the storage sections and the other pair of first and second platforms is aligned with another storage section, and
   wherein the platform units with platforms are borne by an auxiliary frame extending over a length of the first and second frame sides, so as to be reciprocally movable in a horizontal direction, the auxiliary frame being movable up and down along the first and second frame sides and is part of the first mover,
   wherein the first mover is configured to move the platform units borne by the auxiliary frame in the horizontal direction to beyond the series of storage sections in a storey in question, in all storeys with storage sections, in at least one direction, and
   wherein said auxiliary frame extends horizontally at least over a distance of (n−1)×platform width horizontally to beyond the series of storage sections, where n is the number of platforms situated next to each other.

2. The device according to claim 1, wherein the first and the second platform units can be moved by the first mover from a position in which a pair of first and second platforms is aligned with one of the storage sections, and another pair of first and second platforms is aligned with another one of the storage sections, into a position in which the one pair of first and second platforms is aligned with the said other one of the storage sections and the other pair of first and second platforms is aligned with a storage section deviating therefrom.

3. The device according to claim 1, wherein the second mover for the one pair of first and second platforms situated opposite each other are operable independently of the second mover for the other pair of first and second platforms situated opposite each other.

4. The device according to claim 1, wherein within the storeys all storage sections are situated in the horizontal direction, at a fixed centre-to-centre distance from each other, corresponding with the centre-to-centre distance of the platforms within the platform units.

5. The device according to claim 4,
   wherein the frame comprises columns situated at the first and second frame sides, spaced apart from the corners of the frame, and situated between the storage sections,
   wherein the columns apart from a supporting function also a carry out a guiding function in guiding the auxiliary frame, wherein the column functions are divided over first column parts for the guiding function and second column parts for the supporting function,
wherein the first and second column parts are situated next to each other in an extension direction transverse to the first and second frame sides.

6. The device according to claim 5, wherein columns situated at the corners of the frame have a width corresponding with the width of the columns in the first and second frame sides.

7. The device according to claim 1, having at least one transfer device located at a same level transferring holders from an entry track to one or more of the platforms and for transferring holders from one or more of the platforms to an exit track,
wherein the platforms are alignable with the transfer device in question by the first mover for receiving holders therefrom and discharging holders thereto, respectively, and
wherein the transfer device in question is arranged for receiving a holder from the entry track and for discharging a holder to the exit track,
wherein the at least one transfer device is provided with a third mover for the holders for transferring holders from the entry track to one or more of the platforms and for transferring holders from one or more of the platforms to the exit track.

8. The device according to claim 7, wherein at least one of the storeys of the frame is provided with a transfer device housed in said storey and is, when considered in vertical projection on a horizontal plane, situated within the profile of the storage sections.

9. The device according to claim 7, wherein the transfer device is configured multiple, one transfer device for each pair of first and second platforms.

10. A device for keeping articles in temporary storage, comprising:
a frame having at least one series of mutually parallel, elongated storage sections, placed in a column set-up and extending between a first frame side and a second frame side of the frame,
the frame forming a series of storeys in which the series of storage sections are accommodated,
the storage sections being provided with holder supports on which series of holders for the articles are supported;
at the first frame side and the second frame side, at least one first and at least one second platform are respectively arranged, each platform being configured for receiving at least one holder;
a first mover for moving the platforms from a position in which both are aligned with one of the storage sections to a position in which both are aligned with another one of the storage sections; and
second movers for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction,
wherein at least two first platforms and at least two second platforms, respectively, are disposed at both frame sides,
wherein the at least two first platforms are part of a first platform unit that are movable as one unity and the at least two second platforms are part of a second platform unit that are movable as one unity,
wherein, in the first platform unit, two first platforms are situated straight above one another,
wherein, in the second platform unit, two second platforms are situated straight above one another,
wherein the first and the second platform units are movable by the first mover from a position in which a pair of first and second platforms are aligned with one storey of the frame and another pair of first and second platforms is aligned with another storey of the frame, to a position in which the one pair of first and second platforms is aligned with another storey of the frame and the other pair of first and second platforms is aligned with a storey of the frame deviating therefrom, and
wherein at least one of the storeys of the frame is provided with a transfer device housed in said storey, said storey being a transfer storey.

11. The device according to claim 10,
wherein the vertical mutual distance between at least almost all storeys is t,
wherein the vertical mutual distance between the two first platforms and the two second platforms, respectively, is n×t, where n belongs to N.

12. The device according to claim 11, wherein in a case where the column set-up in question a storage section is situated below or above, respectively, the transfer storey, said storage section is situated below or above, respectively, the transfer storey at a distance corresponding with the vertical mutual distance of the platforms.

13. The device according to claim 12,
wherein the vertical mutual distance between the platforms is n×t, and
wherein the transfer storey is situated at a vertical distance of t or n×t, below the storage section situated above the transfer storey or the storage section situated below the transfer storey, respectively.

14. The device according to claim 13,
wherein the transfer storey is situated at a vertical distance of t1, below the storage section situated above the transfer storey or above the storage section situated below the transfer storey, respectively, where the distance t1 deviates from a full number of times the said mutual distance t, and
wherein the transfer storey is situated at the same distance t1 from the storage section situated below or above the transfer storey, respectively, where the vertical mutual distance of the platforms is t1.

15. The device according to claim 13, with platform units having platforms situated next to each other, wherein the transfer device is arranged with parallel connections of entry track and exit track or with several aligned sets of entry tracks/exit tracks.

16. The device according to claim 1,
wherein the holders have mutually identical lengths,
wherein the maximum number of holders in a storage section is n1 and the maximum number of holders on a platform is n2, where n1=2×n2.

17. The device according to claim 1,
wherein the first mover is configured for moving the platform units borne by the auxiliary frame in a horizontal direction to beyond the series of storage sections in a storey in question in all storeys with storage sections, in both directions,
wherein within the platform units, the platforms are situated next to each other and said auxiliary frame extends horizontally at least over a distance of (n−1)× platform width horizontally to beyond the series of storage sections in both directions, where n is the number of platforms situated next to each other.

18. The device according to claim 7, wherein the auxiliary frame extends beyond the series of storage sections in the storey located at the level of said transfer device in said one direction so as to allow alignment of platforms of the platform units with the transfer device.

19. A device for keeping articles in temporary storage, comprising:
a frame having at least one series of mutually parallel, elongated storage sections, placed in a column set-up and extending between a first frame side and a second frame side of the frame,
the frame forming a series of storeys in which the series of storage sections are accommodated, and
the storage sections being provided with holder supports on which series of holders for the articles are supported;
at the first frame side and the second frame side, at least one first and at least one second platform are respectively arranged, each platform being configured for receiving at least one holder;
a first mover for moving the platforms from a position in which both are aligned with one of the storage sections to a position in which both are aligned with another one of the storage sections; and
second movers for, in a first direction, horizontally moving one or more holders from the platform at the first frame side to the holder supports of a selected storage section, while moving the series of holders supported thereon over the selected storage section and moving one or more holders from the storage section to the platform at the second frame side, and vice versa in a direction opposite the first direction,
wherein at least two first platforms and at least two second platforms are respectively disposed at both frame sides,
wherein the at least two first platforms are part of a first platform unit that are movable as one unity and the at least two second platforms are part of a second platform unit that are movable as one unity,
wherein the first and the second platform units are movable by the first mover from a position in which a pair of first and second platforms are aligned with one storey of the frame and/or with one of the storage sections and another pair of first and second platforms is aligned with another storey of the frame and/or another one of the storage sections, to a position in which the one pair of first and second platforms is aligned with another storey of the frame and/or another one of the storage sections and the other pair of first and second platforms is aligned with a storey of the frame deviating therefrom and/or another storage section,
wherein the device has at least one transfer device for at the same level transferring holders from an entry track to one or more of the platforms and for transferring holders from one or more of the platforms to an exit track,
wherein the platforms are alignable with the transfer device in question by the first mover for receiving holders therefrom and discharging holders thereto, respectively, and
wherein the transfer device in question is arranged for receiving a holder from the entry track and for discharging a holder to the exit track,
wherein the at least one transfer device is provided with a third mover for the holders for transferring holders from the entry track to one or more of the platforms and for transferring holders from one or more of the platforms to the exit track,
wherein said transfer device is housed within one of the storeys of the frame and, in a vertical projection on a horizontal plane, is situated within the profile of the storage sections.

20. The device according to claim 19, wherein the entry track and the exit track extend within the storey in which the transfer device is housed.

* * * * *